United States Patent
Halmshaw

(10) Patent No.: US 7,050,054 B2
(45) Date of Patent: May 23, 2006

(54) METHOD, APPARATUS, SIGNALS AND CODES FOR ESTABLISHING AND USING A DATA STRUCTURE FOR STORING VOXEL INFORMATION

(75) Inventor: Paul A. Halmshaw, North Vancouver (CA)

(73) Assignee: NGRAIN (Canada) Corporation, Vancouver (CA)

( * ) Notice: Subject to any disclaimer, the term of this patent is extended or adjusted under 35 U.S.C. 154(b) by 460 days.

(21) Appl. No.: 10/333,307

(22) PCT Filed: May 16, 2001

(86) PCT No.: PCT/CA01/00686

§ 371 (c)(1),
(2), (4) Date: Jan. 13, 2003

(87) PCT Pub. No.: WO02/07097

PCT Pub. Date: Jan. 24, 2002

(65) Prior Publication Data

US 2003/0156112 A1    Aug. 21, 2003

(30) Foreign Application Priority Data

Jul. 13, 2000    (CA) .................................... 2315302

(51) Int. Cl.
*G06T 15/00*    (2006.01)

(52) U.S. Cl. .................. 345/424; 345/419; 345/427

(58) Field of Classification Search ................ 345/419, 345/420, 421, 422, 424, 427, 428
See application file for complete search history.

(56) References Cited

U.S. PATENT DOCUMENTS

| | | | |
|---|---|---|---|
| 3,602,702 A | 8/1971 | Warnock | |
| 4,709,231 A | 11/1987 | Sakaibara et al. | |
| 4,821,210 A | 4/1989 | Rumbaugh | |
| 4,943,938 A | 7/1990 | Aoshima et al. | |
| 4,985,856 A | 1/1991 | Kaufman et al. | |
| 5,063,375 A | 11/1991 | Lien et al. | |
| 5,079,699 A | 1/1992 | Tuy et al. | |
| 5,083,287 A | 1/1992 | Obata et al. | |

(Continued)

FOREIGN PATENT DOCUMENTS

EP    1 054 359 A2    11/2000

(Continued)

OTHER PUBLICATIONS

Blinn, J.F, "Models of Light Reflection for Computer Synthesized Pictures," *Proceedings of SIGGRAPH '77*, San Jose, Jul. 20-21, 1977, pp. 192-198.

(Continued)

*Primary Examiner*—Phu K. Nguyen
(74) *Attorney, Agent, or Firm*—Christensen O'Connor Johnson Kindness PLLC

(57) ABSTRACT

A data structure includes a plurality of voxel element arrays of memory locations, the arrays being arranged and associated with a set of indices whereby indices of the set identify corresponding memory locations in each array. The data structure further includes a base array for storing an identification of a contiguous group of the memory locations in each array in which voxel elements of a corresponding group of active voxels may be stored. A method of employing the data structure includes associating a column of active voxels in a voxel block, with a group of memory locations in each array, each memory location being associated with a respective index. Geometric representations and attributes of active voxels in the column are stored in respective memory locations of said group.

60 Claims, 14 Drawing Sheets

U.S. PATENT DOCUMENTS

| | | | |
|---|---|---|---|
| 5,088,054 | A | 2/1992 | Paris, II |
| 5,187,660 | A | 2/1993 | Civanlar et al. |
| 5,377,313 | A | 12/1994 | Scheibl |
| 5,412,763 | A | 5/1995 | Knoplioch et al. |
| 5,555,359 | A | 9/1996 | Choi et al. |
| 5,594,842 | A | 1/1997 | Kaufman et al. |
| 5,625,760 | A | 4/1997 | Fujita |
| 5,659,671 | A | 8/1997 | Tannenbaum et al. |
| 5,739,820 | A | 4/1998 | Lyon |
| 5,742,749 | A | 4/1998 | Foran et al. |
| 5,831,623 | A | 11/1998 | Negishi et al. |
| 5,847,711 | A | 12/1998 | Kaufman et al. |
| 5,854,632 | A | 12/1998 | Steiner |
| 5,870,097 | A | 2/1999 | Snyder et al. |
| 5,870,098 | A | 2/1999 | Gardiner |
| 5,905,503 | A | 5/1999 | Penna |
| 5,924,126 | A | 7/1999 | Rosenthal et al. |
| 5,940,067 | A | 8/1999 | Greene |
| 5,963,212 | A | 10/1999 | Bakalash |
| 5,968,148 | A | 10/1999 | Priem |
| 6,008,813 | A | 12/1999 | Lauer et al. |
| 6,018,350 | A | 1/2000 | Lee et al. |
| 6,023,738 | A | 2/2000 | Priem et al. |
| 6,061,066 | A | 5/2000 | Priem |
| 6,065,071 | A | 5/2000 | Priem et al. |
| 6,075,544 | A | 6/2000 | Malachowsky et al. |
| 6,075,545 | A | 6/2000 | De Bonet et al. |
| 6,078,332 | A | 6/2000 | Ohazama |
| 6,081,854 | A | 6/2000 | Priem et al. |
| 6,092,124 | A | 7/2000 | Priem et al. |
| 6,094,203 | A | 7/2000 | Desormeaux |
| 6,144,383 | A | 11/2000 | Lichtenbelt et al. |
| 6,169,553 | B1 | 1/2001 | Fuller et al. |
| 6,175,367 | B1 | 1/2001 | Parikh et al. |
| 6,195,099 | B1 | 2/2001 | Gardiner |
| 6,226,005 | B1 | 5/2001 | Laferrière |
| 6,226,007 | B1 | 5/2001 | Brown |
| 6,243,488 | B1 | 6/2001 | Penna |
| 6,356,265 | B1 | 3/2002 | Knittel et al. |
| 6,559,843 | B1 * | 5/2003 | Hsu .......................... 345/421 |
| 6,694,163 | B1 * | 2/2004 | Vining ........................ 600/407 |

FOREIGN PATENT DOCUMENTS

GB            2 325 838 A     12/1998

OTHER PUBLICATIONS

"Chapter 2, Background," <http//:visual.nlm.nih.gov/~dave/vetl/diss/ch2/chapter2.html> [retrieved Jun. 18, 2002], 9 pages.

"CIE 1988 2° Spectral Luminous Efficiency Function for Photopic Vision," *Publication CIE 86-1990*, <http://www.cie.co.at/cie/publ/abst/86-90.html> 1 page.

Dzik, S., and J. Ezrielev, "Representing Surfaces with Voxels," *Computers & Graphics* 16(3):295-301,1992.

Fang, A.C.-H., et al., "Interactive Surface Rendering for Medical Visualization," *Graphics Interface*, May 1995, 16 pages.

Foley, J.D., et al., *Computer Graphics: Principles and Practice*, 2d ed., Addison-Wesley, Reading, Mass., 1990, Chapter "Illumination and Shading," pp. 723-726; Chapter "Volume Data," pp. 914-915; and Chapter "Volume Rendering," pp. 1034-1039.

Foley, J.D., and A. Van Dam, *Fundamentals of Interactive Computer Graphics*, Addison-Wesley, Reading, Mass., Jul. 1984, Chap. 16, "Shading Models," pp. 575-577.

Freund, J., and K. Sloan, "Accelerated Volume Rendering Using Homogeneous Region Encoding," *IEEE Visualization '97 Proceedings*, Phoenix, Oct. 19-24, 1997, pp. 191-196.

Huang, J., et al., "FastSplats: Optimized Splatting on Rectilinear Grids," *IEEE Visualization 2000 Proceedings*, Salt Lake City, Oct. 8-13, 2000, 8 pages.

Ihm, I., and R.K. Lee, "Indexing Data Structures for Faster Volume Rendering," *Computers & Graphics* 21(4):497-506,1997.

Kaufamn, A., et al., "A Survey of Architectures for Volume Rendering," *IEEE Engineering in Medicine and Biology*, Dec. 1990, pp. 18-23.

Lacroute, P., and M. Levoy, "Fast Volume Rendering Using Shear-Warp Factorization of the Viewing Transformation," *Computer Graphics Proceedings, Annual Conference Series*, 1994, pp. 451-458.

Lacroute, P., "Fast Volume Rendering Using Shear-Warp Factorization of the Viewing Transformation," Ph.D. dissertation, Technical Report CSL-TR-95-678, Stanford University, 1995, pp. 29-43.

Levoy, M., "Efficient Ray Tracing of Volume Data," *ACM Transactions on Graphics* 9(3):245-261, 1990.

Lyon, R.F., "Phong Shading Reformulation for Hardware Renderer Simplification," *Apple Technical Report #43*, Aug. 2, 1993, pp. 1-32.

Pfister, H., "Architectures for Real-Time Volume Rendering," *Future Generation Computer Systems* 15:1-9, 1999.

Phong, B.T., "Illumination for Computer Generated Pictures," *Communications of the ACM* 18(6):311-317, Jun. 1975.

Rheingans, P., "Volume Rendering," Lecture 6, University of Maryland, Baltimore County, as early as 1989, 22 pages.

Swan II, J.E., et al., "An Anti-Aliasing Technique for Splatting," *IEEE Visualization '97 Proceedings*, Phoenix, Oct. 19-24, 1997, pp. 197-204.

Woo, A., and J. Amanatides, "Voxel Occlusion Testing: A Shadow Determination for Ray Tracing," *Conference Proceedings of Graphics Interface*, Toronto, May 1990, 7 pages.

Yagel, R., et al., "Discrete Ray Testing," *IEEE Computer Graphics & Applications*, Sep. 1992, pp. 19-28.

Yagel, R., et al., "Realistic Volume Imaging," *IEEE Visualization '91 Proceedings*, San Diego, Oct. 1991, pp. 226-231 & 425.

Applicant's electronic publication of a number of markup documents, data files, image files, and other executable files, including a file entitled "FLAMINGO.EXE," at http://www.directvoxel.com May of 2000, as represented in enclosed screenshots (pp. 1-29).

* cited by examiner

METHOD, APPARATUS, SIGNALS AND CODES FOR ESTABLISHING AND USING A DATA STRUCTURE FOR STORING VOXEL INFORMATION

FIELD OF INVENTION

This invention relates to the storage of volumetric data and more particularly to methods of organizing volumetric data, a data structure which facilitates storage of volumetric data and methods for interacting with the data structure to retrieve, store and delete volumetric data from the data structure.

DESCRIPTION OF RELATED ART

Volumetric data may be produced by a variety of devices that involve 3D scanning or sampling and/or numerical modeling. Rendering of such data on a display such as a 2D graphics device is desirable to make use of the data. However, volumetric data normally involves a very large number of data values or set of data. For example, a typical Magnetic Resonance Image (MRI) scanner volume data set may represent data for perhaps 6.7 million voxels. To render data sets of this magnitude on 2D displays, a significant amount of processing power and memory is conventionally required.

Rendering is the process of displaying 3-dimensional image data on a typically two-dimensional display, at a predetermined viewing angle. In volume rendering there is often a need to be able to view the rendered image from various angles. To do this the 3 dimensional image data is mapped onto a projection plane at an orientation relative to a reference point associated with the 3-dimensional image data. This projection plane may be referred to as a view space or image space, which, in the case of a two-dimensional display may be a pixel map of the display.

The orientation of the projection plane and hence the orientation of the image space defines the direction from which the volume data set is viewed and rendered. Thus a key step in the volume rendering process is the mapping of the original volume data set into the view space. Typical mapping may involve transformations including zoom, pan, rotation and even shear features, for example, thus further increasing the amount of processing required to effect rendering.

Traditionally voxel information is rendered using a ray tracing process. A ray is an imaginary line emanating from a pixel in the image space and extending through a voxel block to a termination point. Thus a ray must be produced for each pixel in the image space and the effect of each voxel through which the line extends must be considered in determining how the pixel will be controlled to display a representation of what would be seen when viewing along the ray. Typically, information associated with voxels through which the line emanates is accessed in a random fashion that slows the acquisition of the information, thereby slowing the rendering process. This is also a computationally intense procedure and normally requires the use of dedicated or specialized graphics processing computers to achieve any reasonable speed in rendering. Alternatively polygon-style engines exist for rendering images of surface objects. However, polygon-style processes are still computationally intensive and cannot render images of solid objects.

To deal with the large amounts of data in a volumetric data set, hardware acceleration techniques have been popular and more recently methods of volumetric data organization have been employed to deal with such data more efficiently. See, for example, U.S. Pat. No. 6,144,383 to Lichtenbelt et al. which discloses the use of sub-volumes to facilitate the use of ray tracing rendering techniques. Other inventors have dealt with the problem of volumetric data rendering in other ways, as described in U.S. Pat. No. 5,412,763 A; Kaufman A. E. et al, "A Survey of Architectures for Volume Rendering", IEEE Engineering in Medicine and Biology Magazine, December 1990, USA, Vol. 9, No. 4; Dzik, S. et al, "Representing Surfaces With Voxels", Computers and Graphics, Pergamon Press Ltd., Oxford, G.B., Vol. 16, No. 3, 1992; U.S. Pat. No. 6,075,545 A; GB 2,325,838; and Insung Ihm, Rae Kyoung Lee; "Indexing Data Structures for Faster Volume Rendering"; Comput. Graph. (UK) Computers and Graphics, July–August 1997, Elsevier UK, ISSN 0097-8493, Vol. 21, No. 4.

In prior art systems, however, memory may be wasted by storing information associated with voxels that provide no information about an object of interest in the model or by redundant storage of information associated with voxels of interest.

As a result of the need to be able to perform computationally intensive processes and of the need for memory to store large amounts of data special processors and relatively large amounts of memory are required to effect volumetric data rendering. The cost of such processors and the space required to accommodate large amounts of memory has been a prohibiting factor in improving graphics capabilities on personal computers.

Thus, it would be desirable to provide a system which is memory efficient in storing information only about voxels of interest and which provides fast access to this information when desired. The present invention addresses this need.

SUMMARY OF THE INVENTION

The present invention addresses the above needs by providing a method and apparatus for organizing volumetric data, a data structure which facilitates storage of volumetric data and methods for interacting with the data structure to retrieve, store and delete volumetric data from the data structure.

In accordance with one aspect of the invention, there is provided a volumetric data organization method for organizing data associated with active voxels in a voxel block, where active voxels are those for which information has been obtained or provided. The method involves causing each active voxel in a column of voxels in the voxel block to be associated with a respective consecutive memory location in a first group of memory locations associated with the column, and causing position information indicating positions of the active voxels in the column to be stored in respective consecutive memory locations of the first group.

Causing position information to be stored may comprise causing the position information of consecutive active voxels in the column to be stored in respective consecutive memory locations in order of increasing distance of the consecutive active voxels from a base of the voxel block. Causing each active voxel to be associated with a respective consecutive memory location may also or alternatively comprise determining the number of active voxels in the column. Causing each active voxel to be associated with a respective consecutive memory location may also or alternatively comprise locating a group of the consecutive memory locations having at least the same number of memory locations as the number of active voxels in the column, for use as the first group.

The method may also involve associating the column with an element in a base array. Each of the consecutive memory locations may be associated with a respective index and associating the column with the element in a base array may comprise associating the element with a representation of a starting index associated with a first memory location associated with a first active voxel in the column and associating the element with a representation of a number of active voxels in the column.

The method may involve changing the representation of the starting index when volumetric data representing a voxel in a position nearer to a reference position is received.

The method may involve changing the representation of the number of active voxels in the column when the number of active voxels in the column changes.

Locating the group of consecutive memory locations may comprise associating with the column, a starting index of a group of consecutive memory locations previously used.

Associating may comprise storing the starting index in a base array. Locating a group of consecutive memory locations may comprise associating with the column a starting index of a free space.

The method may involve producing the new free space starting index and may involve causing each active voxel in the column of voxels in the voxel block to be associated with a respective consecutive memory location in a second group of memory locations associated with the column, and causing attribute information relating to the active voxels in the column to be stored in respective consecutive memory locations of the second group of memory locations associated with the column.

The method may involve maintaining a plurality of stacks associated with different sized groups of memory locations, each stack being operable to holds at least one identifier identifying a group of corresponding size.

The method may also involve configuring each stack to hold at least one index identifying the start of the group of corresponding size. Configuring the each stack may comprise causing the different sized groups of memory locations to have sizes defined as a function of packing density. Configuring each stack may comprise configuring the different sized groups of memory locations to have sizes n(PD+1) where n is an integer multiplier and PD is a packing density value.

The method may involve defining voxel element arrays for storing position information or attribute information within a wad of memory. Defining may comprise defining the voxel element arrays within a wad of memory located within a page of memory. Defining may also comprise defining the voxel element arrays to have a management area and a free space area and defining a base array in the management area of at least one of the voxel element arrays.

In accordance with another aspect of the invention, there is provided a computer readable medium for providing codes for directing a processor circuit to organize volumetric data associated with active voxels in a voxel block, where active voxels are those for which information has been obtained or provided. The codes direct the processor circuit to organize the volumetric data by causing each active voxel in a column of voxels in the voxel block to be associated with a respective consecutive memory location in a first group of memory locations associated with the column, and by causing position information indicating positions of the active voxels in the column to be stored in respective consecutive memory locations of the first group.

In accordance with another aspect of the invention, there is provided a signal embodied in a carrier wave, the signal comprising a first code segment for directing a processor circuit to cause each active voxel in a column of voxels in a voxel block to be associated with a respective consecutive memory location in a first group of memory locations associated with the column, and a second code segment for directing the processor circuit to cause position information indicating positions of the active voxels in the column to be stored in respective consecutive memory locations of the first group.

In accordance with another aspect of the invention, there is provided an apparatus for organizing volumetric data associated with active voxels in a voxel block, where active voxels are those for which information has been obtained or provided. The apparatus includes means for causing each active voxel in a column of voxels in the voxel block to be associated with a respective consecutive memory location in a first group of memory locations associated with the column and means for causing position information indicating positions of the active voxels in the column to be stored in respective consecutive memory locations of the first group.

In accordance with another aspect of the invention, there is provided an apparatus for storing a volume data set representing at least geometric representations of active voxels in a voxel block where active voxels are those for which information has been obtained or provided. The apparatus includes memory operable to be divided into a plurality of wads of memory locations, and a processor circuit operable to communicate with the memory to cause a column of active voxels in the voxel block to be associated with a group of consecutive memory locations in at least one of the wads and to cause representations of respective active voxels in the column to be stored in respective consecutive memory locations.

In accordance with another aspect of the invention, there is provided a volumetric data organization method for organizing volumetric data associated with active voxels in a voxel block, where active voxels are those for which information has been obtained or provided. The method involves associating a column of active voxels in the voxel block with a contiguous group of indices associated with corresponding memory locations in a plurality of information arrays and causing elements of information about each active voxel to be stored in respective information arrays, such that each active voxel is associated with a corresponding index and the index identifies memory locations in respective information arrays at which respective elements of information about each active voxel are stored.

In accordance with another aspect of the invention, there is provided a data structure embodied in a computer readable medium, the data structure comprising a plurality of voxel element arrays comprised of consecutive memory locations, the arrays being arranged and associated with a set of indices whereby indices of the set identify corresponding consecutive memory locations in each array of the voxel element arrays, and a base array for storing an identification of a contiguous group of the memory locations in each array in which voxel elements of a corresponding group of active voxels in the same column of a voxel block may be stored.

In accordance with another aspect of the invention, there is provided a method of facilitating storage of voxel information in a data structure, where the voxel information is associated with active voxels in a voxel block, the active voxels being those for which information has been obtained or provided. The method involves defining a plurality of voxel element arrays of memory locations for storing the voxel information, associating the arrays with a set of indices whereby indices of the set identify corresponding memory locations in each array in the voxel element arrays, and defining a base array for storing an identification of a group of consecutive memory locations in each array in which voxel information of a corresponding group of active voxels may be stored. Storing the identification may comprise storing an index and a count of voxel indices associated with the group of consecutive memory locations.

The method may involve defining a plurality of stacks and associating the stacks with different sized groups of consecutive memory locations, each stack being operable to hold at least one identification identifying a group of corresponding size.

The method may involve defining the stacks such that the different sized groups of consecutive memory locations have sizes defined as a function of packing density.

The method may involve defining the stacks such that the different sized groups of consecutive memory locations have sizes n(PD+1) where n is an integer multiplier and PD is a packing density value. Defining may comprise associating a wad of memory locations with the voxel element arrays and defining within each of the voxel element arrays a management area and a free space area. Defining the base array may comprise defining the base array in the management area of at least one of the voxel element arrays.

The method may also involve invoking an insertion routine to store information about an active voxel in the data structure.

The method may also involve invoking a deletion routine to delete information about an active voxel in the data structure.

The method may also involve invoking a read routine to obtain information about an active voxel from the data structure.

In accordance with another aspect of the invention, there is provided a computer readable medium for providing codes for directing a processor to facilitate storage of voxel information in a data structure where the voxel information is associated with active voxels in a voxel block, the active voxels being those for which information has been obtained or provided, by defining a plurality of voxel element arrays of memory locations for storing the voxel information, associating the arrays with a set of indices whereby indices of the set identify corresponding memory locations in each array of the voxel element arrays, and defining a base array for storing an identification of a contiguous group of memory locations in each array in which voxel information of a corresponding group of active voxels may be stored.

In accordance with another aspect of the invention, there is provided a signal embodied in a carrier wave, the signal comprising a first code segment for directing a processor circuit to define a plurality of voxel element arrays of memory locations for storing voxel information, a second code segment for directing the processor circuit to associate the arrays with a set of indices whereby indices of the set identify corresponding memory locations in each array of the arrays, and a third code segment for directing the processor circuit to define a base array for storing an identification of a contiguous group of memory locations in each array in which voxel information of a corresponding group of active voxels may be stored.

In accordance with another aspect of the invention, there is provided an apparatus for facilitating storage of voxel information in a data structure where the voxel information is associated with active voxels in a voxel block, the active voxels being those for which information has been obtained or provided. The apparatus includes means for defining a plurality of voxel element arrays of memory locations for storing the voxel information, means for associating the arrays with a set of indices whereby indices of the set identify corresponding memory locations in each array of the arrays, and means for defining a base array for storing an identification of a contiguous group of memory locations in each array in which voxel information of a corresponding group of active voxels may be stored.

In accordance with another aspect of the invention, there is provided a method of accessing a voxel element associated with a designated voxel where the voxel elements are stored in the a structure. The method involves locating in the data structure an index associated with the designated active voxel, outputting the voxel element from memory locations identified by the index.

In accordance with another aspect of the invention, there is provided a method of reading elements of a voxel record. The method involves specifying a column of a voxel block in which a voxel identified by the voxel record is located, specifying a position along the column, from a reference position in the voxel block, at which the voxel is located in the column, finding an index associated with the voxel, and causing the contents of a memory location associated with the index to be output. The method may further involve causing the contents of a plurality of memory locations associated with the index to be output.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
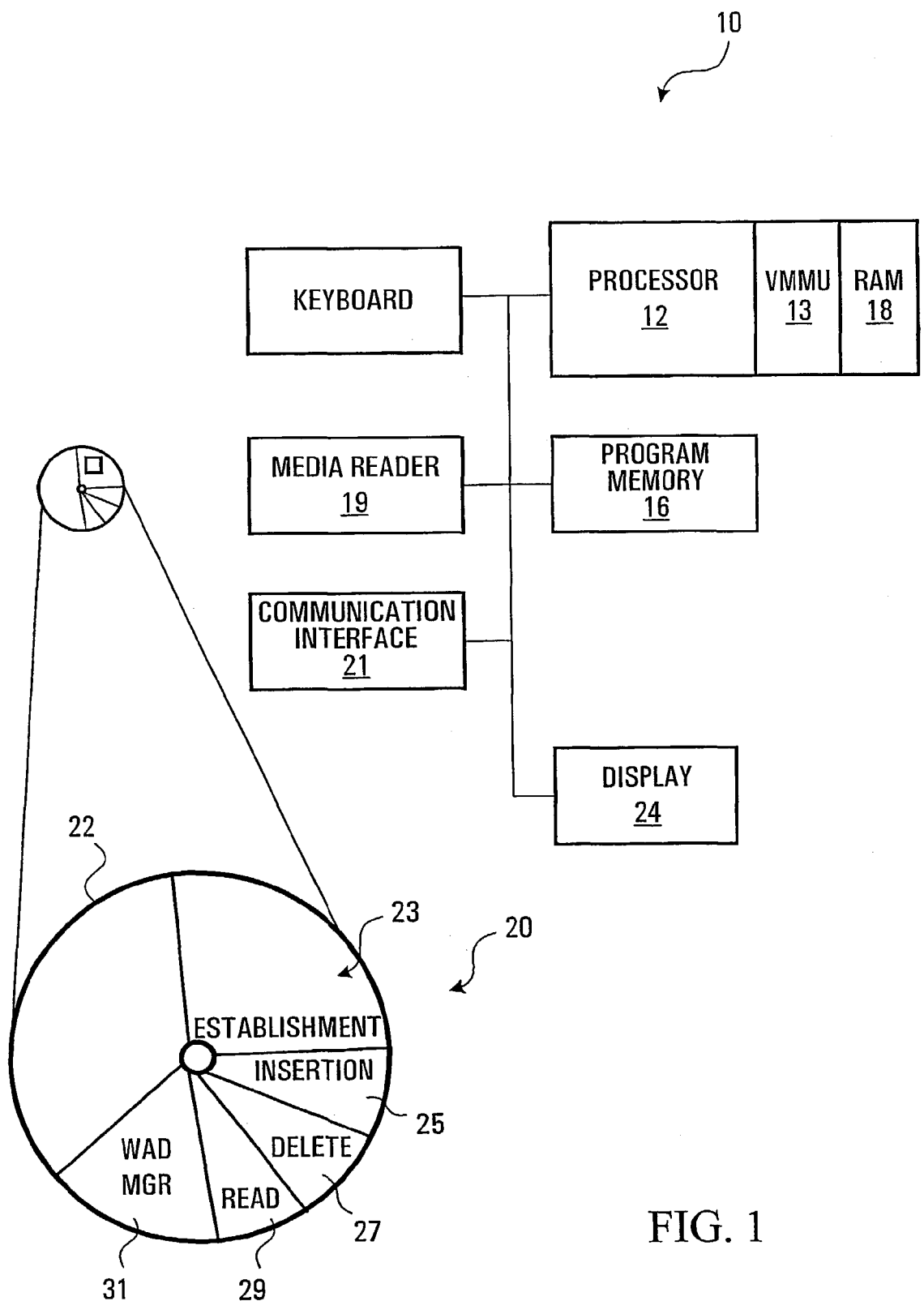
FIG. 1 is a block diagram of a computer system implementing a data structure and apparatus for storing imaging data, according to a first embodiment of the invention.

Referring to FIG. 1, an apparatus according to one embodiment of the invention is shown generally at 10. In this embodiment, the apparatus comprises a computer system, such as a personal computer having a processor circuit 12, program memory 16 and random access memory 18. The processor circuit 12 has a virtual memory mapping unit (VMMU) 13 which converts logical addresses provided by any applications programs running on the processor circuit to physical memory address space in the random access memory 18. The processor circuit 12 runs an operating system (not shown) which is operable to define cache memory within the random access memory 18 and to work in pages of memory therein.

The computer system 10 may further include a media reader 19 in communication with the processor circuit 12 for enabling the processor circuit to read a set of codes 20 or computer program, from a computer readable medium 22 such as a floppy disk, a hard disk, a CD-ROM, or a communications channel, for example. Alternatively, the set of codes 20 may be provided as segments of a signal embodied in a carrier wave received at a communications interface 21 in communication with the processor circuit 12, for example. In other words, the set of codes or program may be downloaded from a communications system such as the Internet, into the computer system 10.

The set of codes 20 implements a data structure establishment and interface program operable to be stored in the program memory 16. The program directs the processor circuit 12 to carry out functional actions according to a method for producing a data structure and for storing a volume data set in the data structure, and for interacting with the data set, in accordance with other aspects of the invention. The data structure may be stored in RAM 18, for example.

The set of codes 20 may contain a plurality of segments including a segment 23 associated with an establishment algorithm, a segment 25 associated with an insertion algorithm, a segment 27 associated with a deletion algorithm and a segment 29 associated with a read algorithm and a segment 31 associated with a wad manager, as will be described below. The embodiments herein relate to volumetric data organization to facilitate rendering a volume data set on a 2D graphics display 24 of the computer system 10, but more generally, the invention relates to rendering a volume data set on any type of annunciation device.

Figure 2:
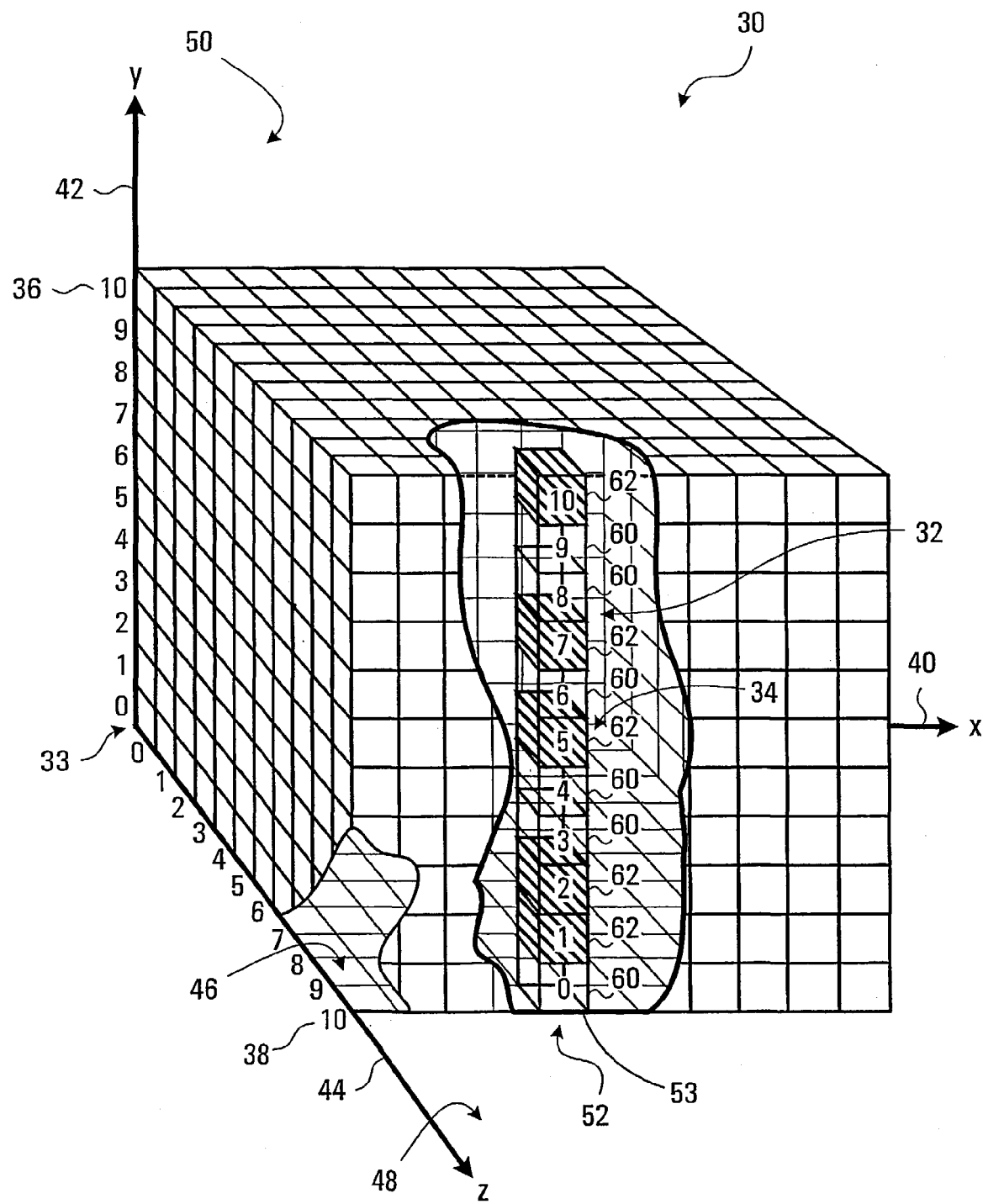
FIG. 2 is a perspective view of a voxel block containing active voxels representing an object model to be stored using the computer system of FIG. 1.

Referring to FIG. 2, the method described herein is intended to be used with a volume data set representing geometric and attribute information about voxels in a voxel block such as shown at 30. Generally, a data acquisition device (not shown) such as a medical imaging device, x-ray device or computer axial tomographic (CAT) x-ray system, for example, may be used to generate geometric and attribute data for a plurality of voxels 32 in the voxel block 30. Alternatively, the volume data set may be received from a graphics application program running on the processor circuit 14 shown in FIG. 1 or may be provided to the processor circuit 14 from an external source through the media reader 19 or communications interface 21, for example. The graphics application program may facilitate entry of volume data through the use of a keyboard or mouse, for example. In this embodiment, the volume data set provided by any source includes geometric information and attribute information including visual information such as color, surface, normal vectors, density and layer information, for example. Attribute information is not limited to visual information or to the examples given here and could include other information, such as smell, sound or tactile information, for example. The type of information included as an attribute may alternatively, or may also be user-defined.

Referring back to FIG. 2, in this embodiment, the voxel block 30 for which the volume data set represents data is a generally orthorhombic shaped 3-dimensional space divided into a plurality of generally cubic regions (voxels 32) of the voxel block 30.

Alternatively, the voxel block may be any other solid shaped 3-dimensional space divided into a plurality of smaller subregions. For example, the voxel block 30 may be approximately cylindrically shaped and the voxels may be small cubic regions or small regions of solid angles formed in columns.

In this embodiment, the voxel block 30 is defined as an orthorhombic block as this shape is most easily mapped into a 2-dimensional coordinate system under which most computer displays operate to generate images. Other display or annunciation systems however, may be more amenable to use with different shaped voxel blocks.

In this embodiment, the voxel block 30 is defined by an origin 33 and maximum x, y and z voxel coordinate positions 34, 36 and 38 along orthogonal x, y and z axes 40, 42 and 44 intersecting the origin 33. In this embodiment, a base 46 of the voxel block 30 lies in an x-z plane 48 established by the x and z axes while one side of the voxel block 30 is coincident with a y-z plane 50 established by the y-z axes. In this embodiment, a geometric position of each voxel 32 within the voxel block 30 can thus be represented by a three-tuple (x, y, z) specifying first, second and third Cartesian coordinates x, y and z. Attributes associated with a voxel 32 can be specified in connection with the geometric position. Thus, the properties of each voxel 32 can be specified by a voxel record comprised of a representation of the geometric position of the voxel in the voxel block 30 and a representation of attributes associated with the voxel. In this embodiment, voxel records of the volume data set may therefore be said to have the following form: Voxel:(x,y,z, a1,a2,a3, . . . an), where x,y,z and a1 . . an are elements of the record and the x,y,z elements specify geometric coordinates of the voxel 32 in the voxel block 30 and the elements a1, . . . an specify n attributes associated with the voxel 32. Alternatively, other coordinate systems may be used and converted to Cartesian coordinates for direct use with the methods disclosed herein.

In general, the voxel block 30 may have non-active voxels such as shown at 60 having no representative information, such as measured information below a threshold level, and may alternatively or further include active voxels such as shown at 62 for which information has been obtained or provided. Effectively, active voxels 62 may represent an object within the voxel block 30 and hence the volume data set may be considered to define an object model which can be specified by three components including: 1) voxel block, or array parameters, i.e., the maximum x, y and z coordinates 34, 36 and 38 of the voxel block: ($X\_size$, $Y\_size$, $Z\_size$); 2) an attribute definition defining the attributes associated with each voxel 32; and 3) a plurality of active voxel records each comprised of geometric information and attributes. In this embodiment the geometric information is represented by a three-tuple (x,y,z), and the attributes are specified according to the attribute definition.

The voxel block 30 may be considered to have a plurality of columns on the x-z plane, one of which is shown at 52, at the x-z position (4, 10). A column of active voxels 53 may be defined as being comprised of only the group of active voxels within a column 52. For example, the column 52 defined along the x-z position (4, 10) has five active voxels at y-positions 1,2,5,7 and 10, and has six non-active voxels at y-positions 0,3,4,6,8 and 9. Thus the column of active voxels 53 is considered to be comprised only of the voxels at y-positions 1,2,5,7 and 10. This avoids wasting memory locations that would otherwise be used to store information about inactive voxels. As will be described below, this column of active voxels 53 will be associated with a contiguous group of memory locations, and each memory location will be associated with an index. Attribute data for a given attribute associated with each of the active voxels in a column is stored in a similar contiguous group of memory locations associated with the same indices. Thus, a single index can be used to identify the geometric representation and the attribute representation of a single active voxel record. Separate contiguous groups are associated with each of the geometric information and respective attribute data for the active voxels in the column. Thus, a structure is defined for storing the voxel records of active voxels in each of the columns and hence for the object model as a whole.

Establishment Algorithm

Figure 3:
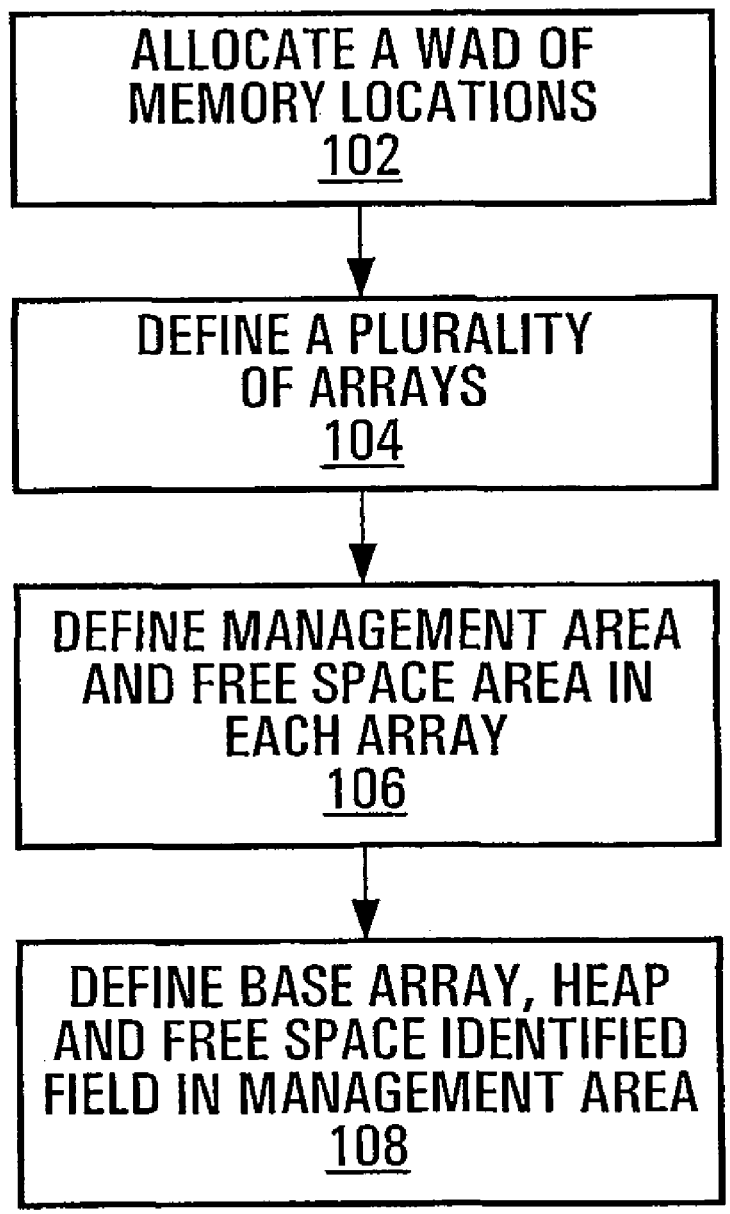
FIG. 3 is a flowchart of an establishment algorithm run by the computer system of FIG. 1.
Figure 4:
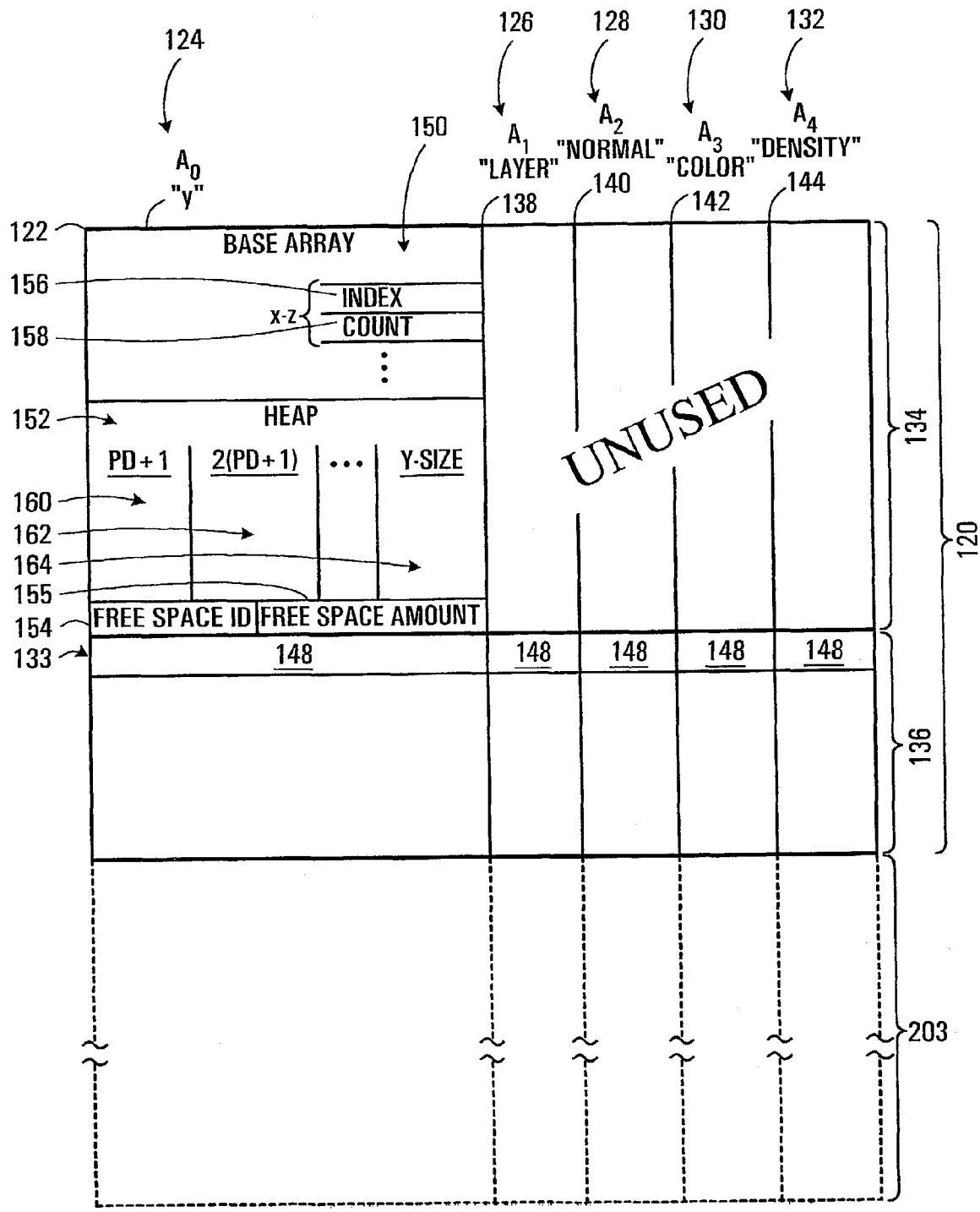
FIG. 4 is a schematic representation of the data structure implemented by the establishment algorithm of FIG. 3.

Referring to FIGS. 3 and 4, to define the desired data structure for storing voxel records the segment 23 shown in FIG. 1, causes the processor circuit 12 to execute an establishment algorithm shown generally at 100. Generally the establishment algorithm 100 facilitates storage of voxel information by directing the processor circuit to 12 define a plurality of voxel element arrays of memory locations for storing voxel information. Under the algorithm the processor circuit 12 is directed to associate the arrays with a set of indices whereby the indices identify corresponding memory locations in each array. Also under the algorithm the processor circuit 12 is directed to define a base array 150 for storing an identification of a contiguous group of memory locations in each array in which voxel elements of a corresponding group of active voxels may be stored.

The algorithm begins with a first block 102 which directs the processor circuit 12 to allocate a wad of memory 120 for use in initiating the data structure described herein. To do this, the wad manager 31 shown in FIG. 1, directs the processor circuit 12 to keep track of pointers to and within memory areas herein referred to as wads of memory 120, associated with the object model.

Next, block 104 directs the processor circuit 12 to define a plurality of voxel element arrays 124, 126, 128, 130 and 132 of contiguous logical memory addresses within the allocated wad of memory 120. Since logical memory locations are contiguous, so are the corresponding physical memory locations. In this embodiment, five arrays 124, 126, 128, 130 and 132 are defined and identified as $A_0$–$A_4$ and each has a size operable to hold $10^9$ (1 Gig) entries. Generally, the sizes of the arrays should be about the same as the maximum x-coordinate 34 in the voxel block 30. The number of arrays to be defined depends upon the number of attributes that are specified in each active voxel record. Separate arrays are used to store respective attributes. In this embodiment, there are four attributes specified in each active voxel record and arrays $A_1$–$A_4$ (126–132) are used to store these attributes. The first array $A_0$ (124) is used to store a y coordinate of each three-tuple providing the geometric information about active voxels and may be referred to as the Y-array. In this embodiment the remaining arrays are used to hold layer, normal, color and density attributes respectively. Also in this embodiment the Y-, layer, normal and color arrays are two bytes wide and the density array is one byte wide, although other word sizes for each array may be used. Nevertheless, each array is operable to hold the same number of entries.

The start of each array 124, 126, 128, 130 and 132 is defined by respective array offsets from the base address 122 to form respective array base addresses 122, 138, 140, 142, 144. Specific locations within an array are addressed by a location offset or index to the associated array base address. Thus, while the arrays 124–132 are actually linear within the logical memory address range of the processor circuit 12, the arrays may be visualized as being aligned with each other as shown in FIG. 4, such that all of the array base addresses 122, 138, 140, 142 and 144 are aligned. The location offset may be referred to as an index which when added to the base address of a given array specifies a specific location in the given array, at which the attribute is located. This allows the geometric data and attributes in a voxel record to be associated with a common index, and the addresses of the memory locations in which such geometric data and attributes may be stored are given by the sum of this index and the appropriate base address associated with the array in which the geometric data or attribute of interest is stored. Thus, by specifying an index and adding the appropriate base address of the array in which desired geometric data or attribute data is stored, such data relating to a voxel record associated with the index may be accessed.

In this embodiment, a wad of memory 120 has a multiple of the number of memory locations in a page of memory defined by the operating system running on the processor circuit 12. The page size may be 2048 or 4096 words or bytes, for example, and in general the page size is greater than or equal to the maximum y coordinate 36 of the voxel block 30. The wad of memory 120 is allocated by specifying a base address 122 within a logical memory address range of the processor circuit 12 and the VMMU 13 converts this base address into a physical memory address for accessing the RAM 18.

Block 106 directs the processor circuit 12 to associate the wad 120 with a given voxel block and to define a management area 134 and a free space area 136 in each array 124–132. More than one wad may be associated with a given voxel block 30, if necessary. The management area 134 is used in the first array 124 while in the second through fifth arrays 126–132 this area is left blank, although it could be used for additional management or other functions. In general, separate pairs of management and free space arrays are associated with respective voxel blocks 30.

As seen in FIG. 4 the management and free space areas 134 and 136 occupy common index positions in respective arrays 124, 126, 128, 130, and 132. Thus each array may be said to have a free space 136 which starts at the same position 148 in each array. This free space 136 will gradually become used up to store information about active voxels in the columns of the voxel block 30. Geometric data of active voxels will be stored in the Y-array 124 and attribute data for active voxels will be stored in the attribute arrays 126–132 such that a single index can be used to identify the locations of memory storing information about a given active voxel in each array.

Block 108 directs the processor circuit 12 to define within the management area 134 of the first array 124, a base array 150, a heap 152, a free space identifier field 154 and a free space amount field 155. The base array 150 holds information about active voxels in columns identified by common x-z pairs and the heap 152 serves to create stacks of indices identifying different sized groups of contiguous memory locations which have been relinquished as will be appreciated below. The free space identifier field 154 is used to hold an index representing the start of the free space 136 in the arrays 124, 126, 128, 130 and 132, and the free space amount field 155 is used to hold a representation of the number of available index locations from the start of the free space 136 to the end of the wad 120.

The base array 150 has dimensions 2(X_size*Z_size) and is addressed by the x and z components of the three-tuple specifying the geometric coordinates of a voxel. For each possible x-z pair of co-ordinates in the voxel block 30 there are two fields including an index field 156 and a count field 158, which in this embodiment, serve to perform the more general function of identifying a contiguous group of memory locations in each array in which voxel elements of a corresponding group of active voxels may be stored. To achieve this, the index field 156 is used to store an index representing a position in the arrays 124, 126, 128, 130 and 132 at which information about the first active voxel in the column specified by the addressing x-z pair is stored. The first active voxel is the one with the smallest y-coordinate. The count field 158 is used to store a number representing the number of active voxels in the column specified by the addressing x-z pair. Thus given any x-z pair, the identity of the first active voxel in the column and the number of active voxels in the column can be found. In other words, the base array 150 associates a column with a group of contiguous memory locations by associating the common x-z pairs of active voxels in the column with the starting index of a group of memory locations, the starting index being stored in the index field 156 of the corresponding position in the base array 150.

The heap 152 includes an area for creating a stack arrangement including stack heads, only three of which are shown at 160, 162, 164, of indices identifying different sized groups of contiguous memory locations. The stack heads 160, 162 and 164 within the heap 152 hold the starting indices of different sized groups of memory locations. In this embodiment, a separate stack head is associated with separate groups of sizes which are multiples of a smallest group size. In this embodiment the smallest group size is specified as a function of a packing density (PD) value. The smallest group size is given as (PD+1). Effectively, the packing density specifies the minimum number of unused memory locations that can be included in any group. Thus, there are stack heads associated with groups of sizes:

(PD+1), 2(PD+1), 3(PD+1), . . . n(PD+1) where n is $$\frac{Y\ size}{(PD+1)}.$$

Initially, the heap 152 includes enough address space to store the indicated plurality of stack heads 160–164. However, these stack heads 160–164 contain no indices until active voxel records are actually stored. Rather, the contents of the stack heads 160–164 and ultimately the stacks to which they relate are dynamic and change to suit an instant set of active voxel records in the object model.

Figure 4A:
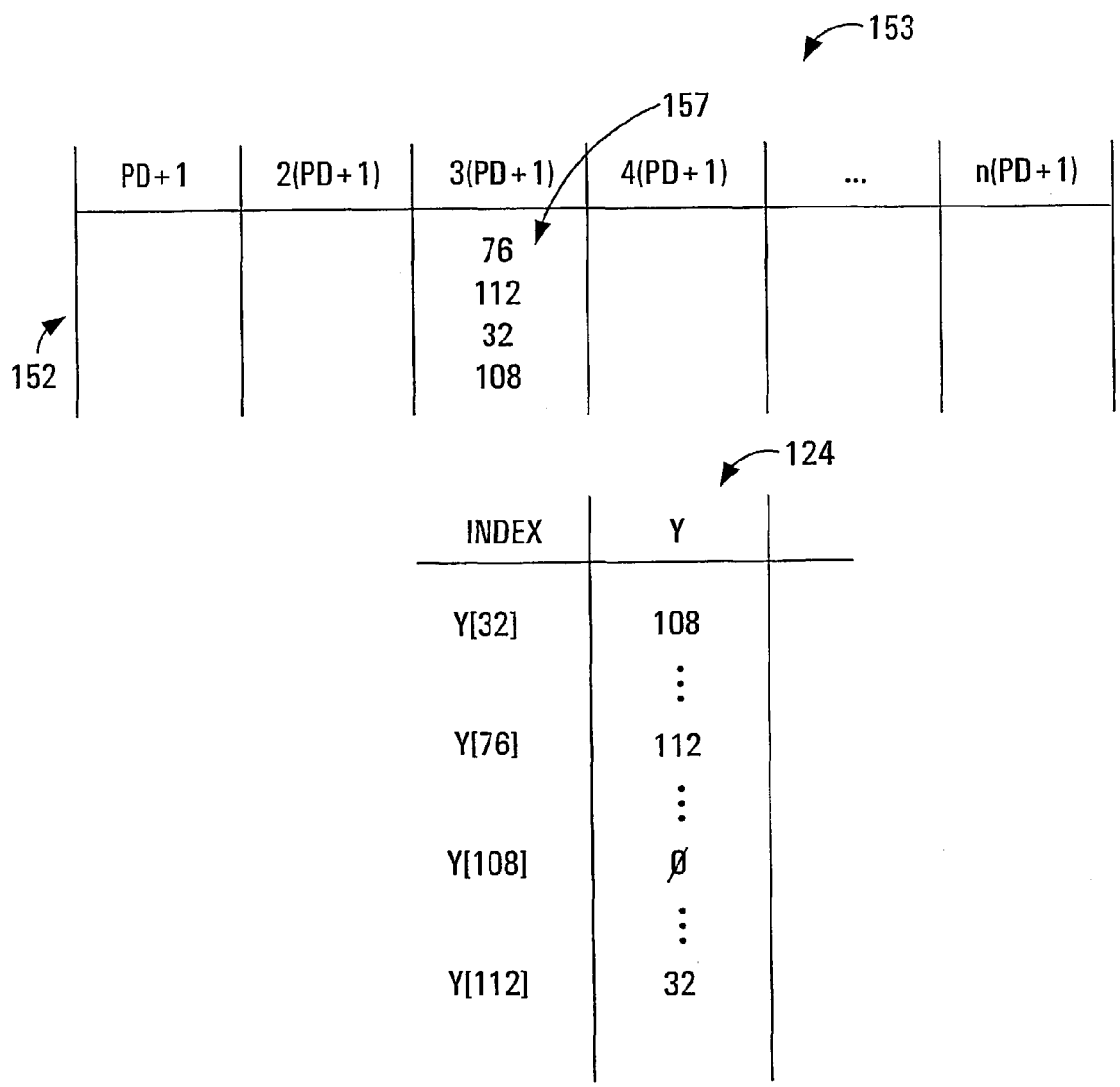
FIG. 4A is a schematic representation of an implementation of a stack in the data structure shown in FIG. 4.

Referring to FIG. 4A, the actual implementation of a stack in this embodiment is shown generally at 153. For explanatory purposes, a stack for groups of the 3(PD+1) is shown generally at 157 and includes the indices 76, 112, 32 and 108. Only the first index (76) in the stack 157 is stored in the heap 152. The remaining indices in the stack 157 are stored in the Y-array 124 at indices of the next lower order. For example, stack index 108 is stored in the Y-array in association with Y-array index 32 and stack index 32 is stored in the Y-array in associated with Y-array index 112. Stack index 112 is stored in the Y-array in association with Y-array index 76. In this way the heap 152 need only store the first available index in the stack and the remaining indices in the stack may be stored in the Y-array. This conserves memory since the Y-array values for the stack are simply replaced with voxel record information as the previously used groups of memory locations are reused.

As will be described in greater detail below, as groups of memory locations are associated with columns of active voxels, when the number of active voxels changes such as due to insertion or deletion of a voxel record the group of memory locations associated with the column may have to change to accommodate the information of more or fewer active voxels. Consequently a current group of memory locations may have to be de-associated with the column and a new appropriate sized group associated with the column.

When a group of a certain size is required for a column, the appropriate stack is addressed to determine if a group of such size has previously been allocated and relinquished and is available for use. If so, the last used index associated with that group size is popped off of that stack and is associated with that column. Thus, the indices associated with a given stack identify the starting indices of groups of memory locations of a size given by the size associated with that stack head.

On completion of the establishment algorithm 100, the processor circuit 12 and memory 18 are essentially configured to act as an apparatus for facilitating storage of voxel information.

Insertion of Voxel Information

Having created the data structure shown in FIG. 4, voxel records may be stored one at a time in the data structure, under the direction of an insertion algorithm. The voxel record currently being operated on by the insertion algorithm may be referred to as the current voxel record.

Figure 5A:
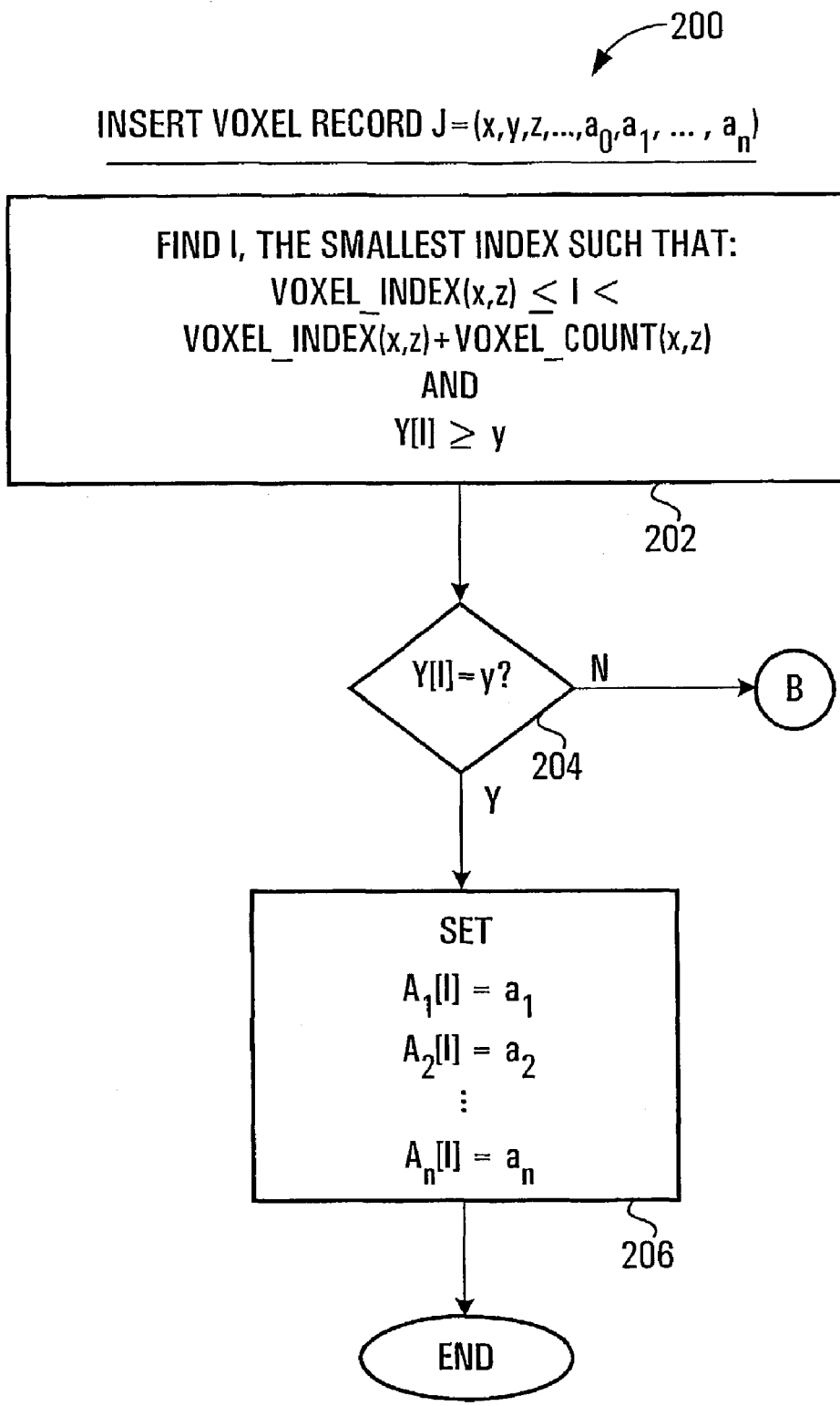
FIGS. 5A–5E depict a flowchart of an insertion algorithm for inserting active voxel information into the data structure shown in FIG. 4.

Referring to FIGS. 5A, 5B, 5C, 5D and 5E, a flowchart representing one embodiment of the insertion algorithm for inserting voxel records into the data structure is shown generally at 200. Separate segments of the algorithm are shown in each figure. Referring to FIG. 5A, the insertion algorithm begins with a first block 202 which directs the processor circuit 12 to find a smallest index value in the Y-array 124 with which the current voxel record is to be associated. The search conditions are that the index to be found must be within the range of indices associated with the column designated by the x-z coordinates of the voxel record. In addition, the value stored in the Y-array at the desired index must be greater than or equal to the y coordinate of the current voxel record. On satisfying these conditions, block 204 directs the processor circuit 12 to determine whether or not the y value stored in the Y-array at the index found in block 202, is equal to the y value of the current record. If so, block 206 directs the processor circuit 12 to simply replace the attribute values stored at the locations specified by the found index value, in the attribute arrays. The algorithm is then ended.

Figure 5B:
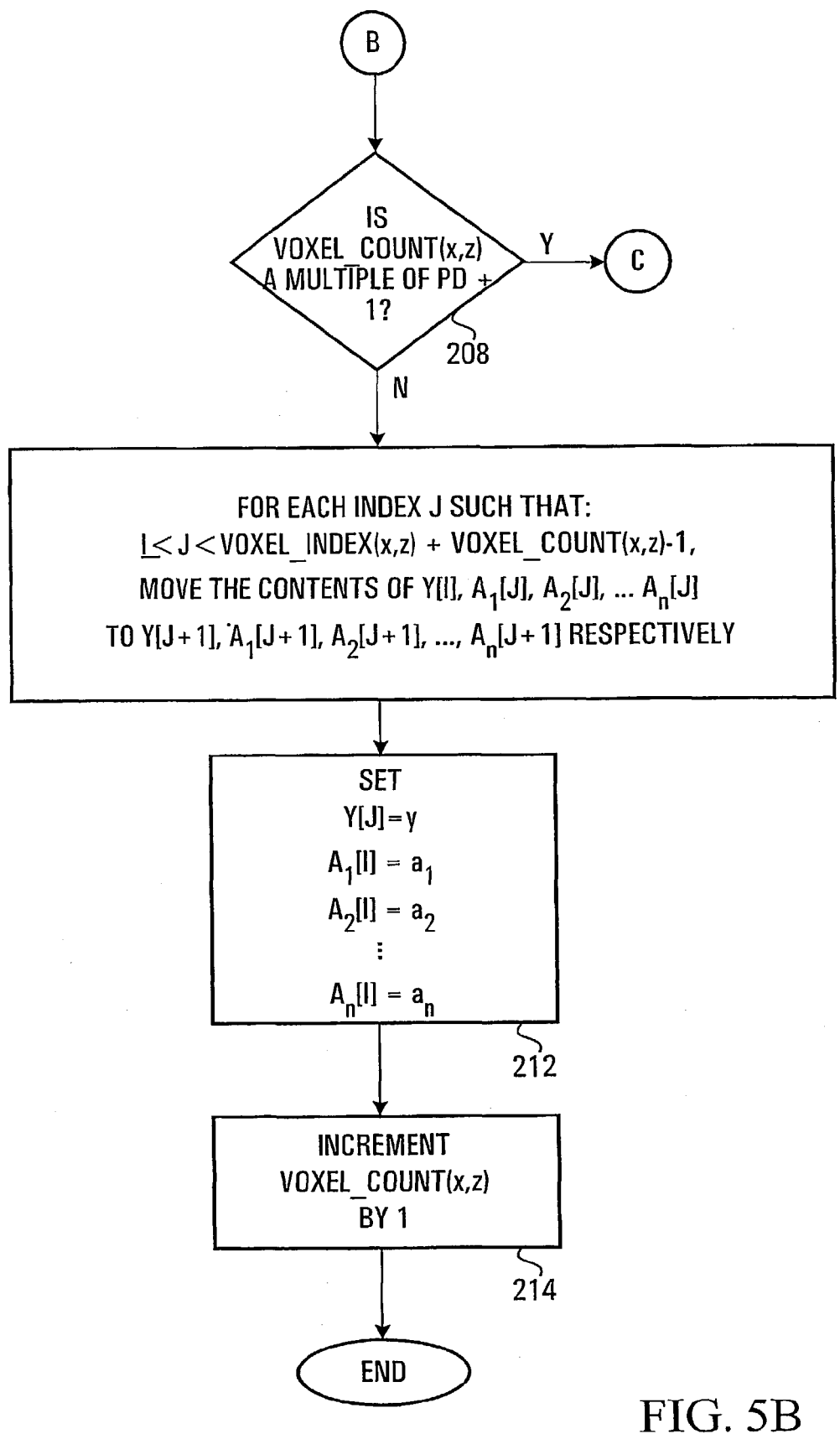

If, at block 204 the y value corresponding to the found index is not equal to the y value of the current voxel record, the processor circuit 12 is directed to the segment of the insertion algorithm shown in FIG. 5B.

The segment of the insertion algorithm shown in FIG. 5B begins with a first block 208 which directs the processor circuit 12 to determine whether or not the voxel count associated with the x-z position of the current record is a multiple of the packing density plus one (PD+1). If it is not, then no new index space need be allocated and block 210 directs the processor circuit 12 to move the y and attribute values of records associated with indices greater than the index associated with the (x-z) coordinates of the current voxel record up one position in the index space of the group to leave an opening in the index space to accommodate the current voxel record. Block 212 then directs the processor circuit 12 to store the y value and attributes of the opening in the index space at the index value associated with the current voxel record and block 214 directs the processor circuit 12 to increment the voxel count associated with the current x-z position by one. The algorithm is then ended.

Figure 5C:
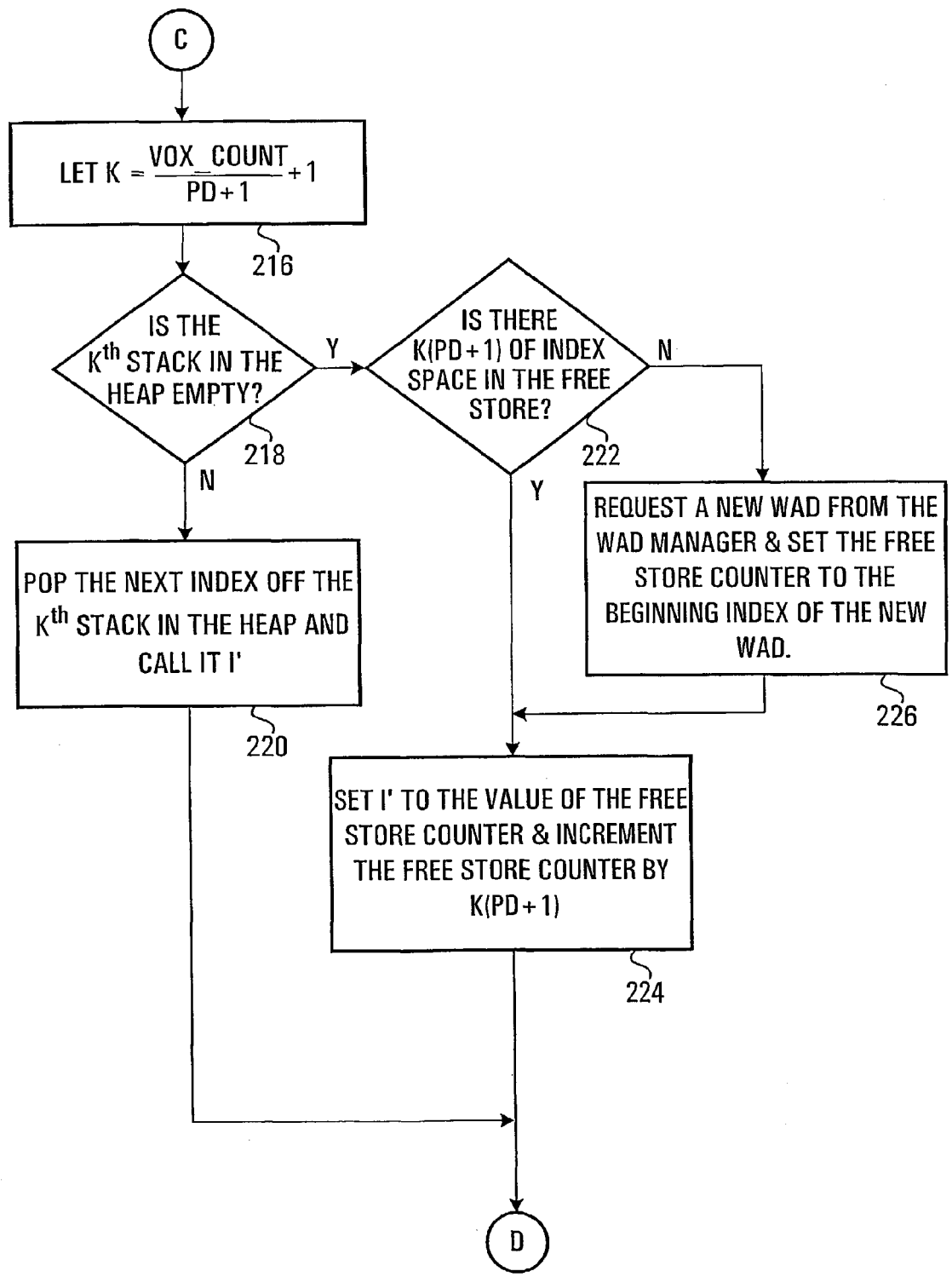

If, at block 208, the voxel count associated with the x-z position specified by the current voxel record is a multiple of PD+1, the processor is directed to the segment of the insertion algorithm shown in FIG. 5C.

Referring to FIG. 5C, this segment of the insertion algorithm begins with block 216 which assigns to a variable K a value given by:

$$K=1+[(\text{Voxel\_Count}(x\text{-}z))/(PD+1)]$$

The value K identifies the size of the group of memory locations required to store the information from all active voxels in the active column.

After having assigned a value to K, block 218 directs the processor circuit 12 to determine whether or not the $K^{th}$ stack in the heap 152 is empty. If it is not empty and there is an index available in the $K^{th}$ stack, block 220 directs the processor to pop the index off the $K^{th}$ stack and to assign it to a variable, Iprime (I'). The processor is then directed to the segment of the insertion algorithm shown in FIG. 5D.

Alternatively, if at block 218, the processor circuit 12 determines that the $K^{th}$ stack is empty, then the processor circuit 12 is directed to block 222 which causes it to read the value in the free space amount field 155 to determine whether there is at least K(PD+1) of index space available in the free space 136. If such space is available, then block 224 directs the processor circuit 12 to store the contents of the free space id field 154 in the Iprime variable, and also directs the processor circuit 12 to increment the free space amount field 155 by K(PD+1). The processor circuit is then directed to the segment of the algorithm shown in FIG. 5D.

If at block 222, the processor circuit 12 determines that there is not sufficient space in the free space 136 to store information relating to K(PD+1) voxel records, block 226 directs the processor circuit to request a new wad 203 of memory from the wad manager 31 and to set the contents of the free space id field 154 to the first index of the new wad. The processor circuit 12 is then directed to block 224 to perform the functions as described above and then to continue with the segment of the insertion algorithm shown in FIG. 5D.

Figure 5D:
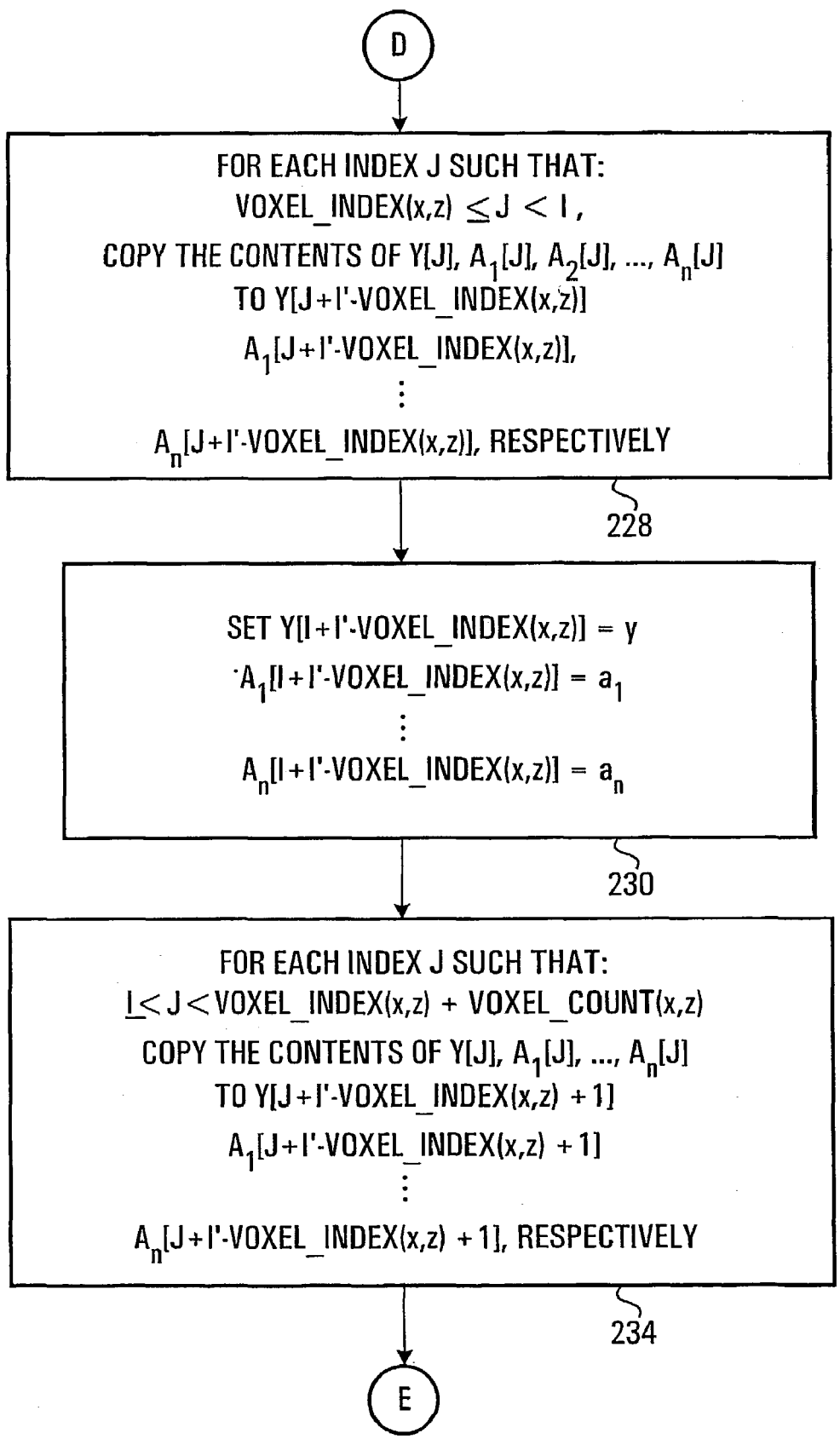

Referring to FIG. 5D, this segment of the insertion algorithm begins with a first block 228 which directs the processor circuit 12 to copy the voxel record information from the group of memory locations identified by the indices less than the index that would be associated with the current voxel record, to a new group of memory locations beginning at the index specified by the Iprime variable. Block 230 then directs the processor circuit to copy the y value and attributes associated with the current record to the memory locations associated with the next index value of the new group, and block 232 directs the processor circuit to store voxel record information associated with indices greater than the next index value in the new group, to the memory locations identified by indices of the new group, which are greater than that next index of the new group. The processor circuit 12 is then directed to the segment of the insertion algorithm shown in FIG. 5E.

Figure 5E:
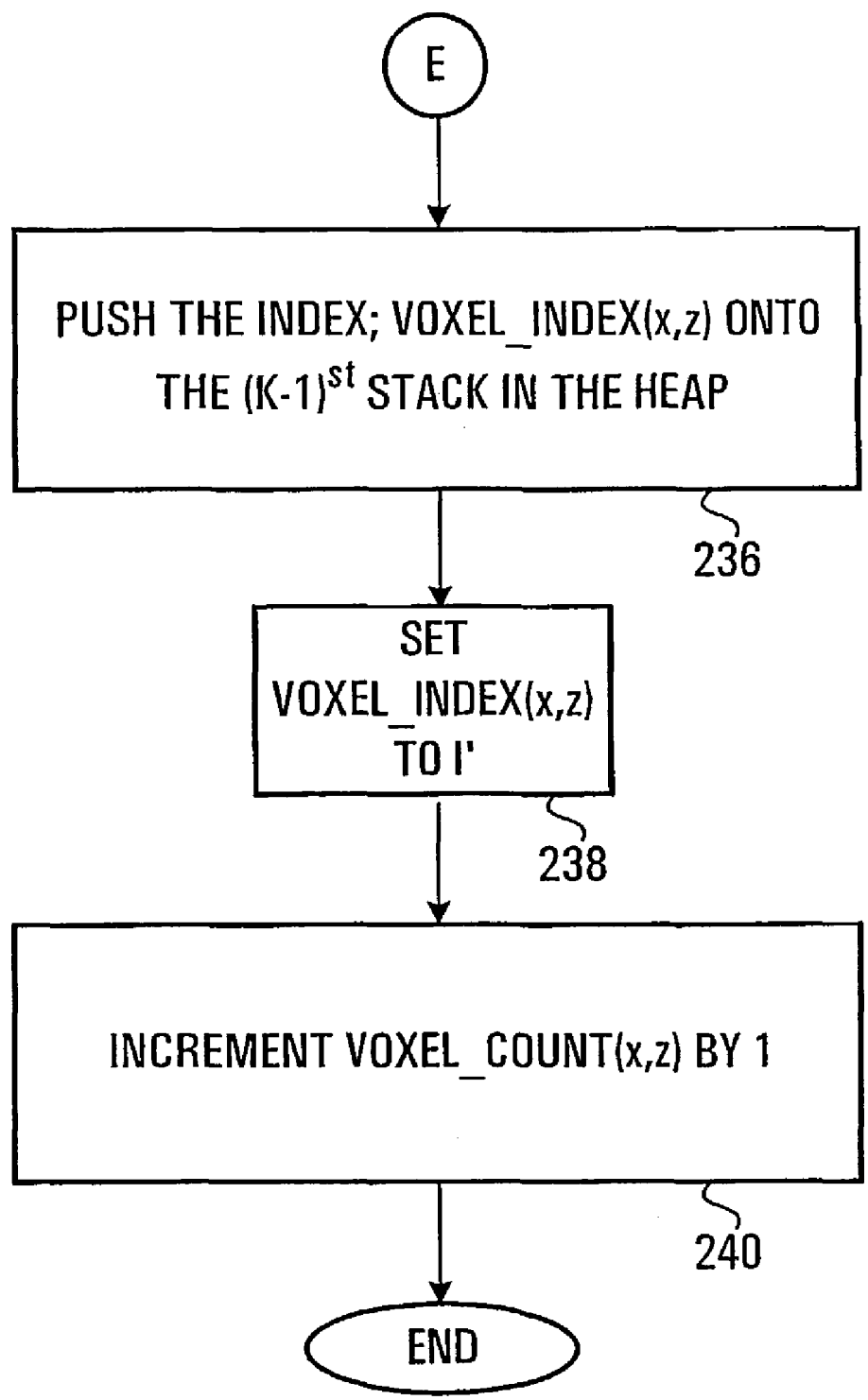

Referring to FIG. 5E, the segment of the insertion algorithm begins with a first block 234 which directs the processor circuit to push the index currently specified by the voxel index associated with the x-z position of the current voxel record, onto the $(k-1)^{st}$ stack in the heap. Block 236 then directs the processor circuit 12 to set the contents of the voxel index field 156 specified by the x-z position, in the base array 150, to the contents of the Iprime variable.

Block 238 then directs the processor circuit 12 to increment by one the contents of the count field 158 associated with the x-z position specified by the current voxel record. The insertion algorithm is then ended.

Deletion of Voxel Information

Figure 6A:
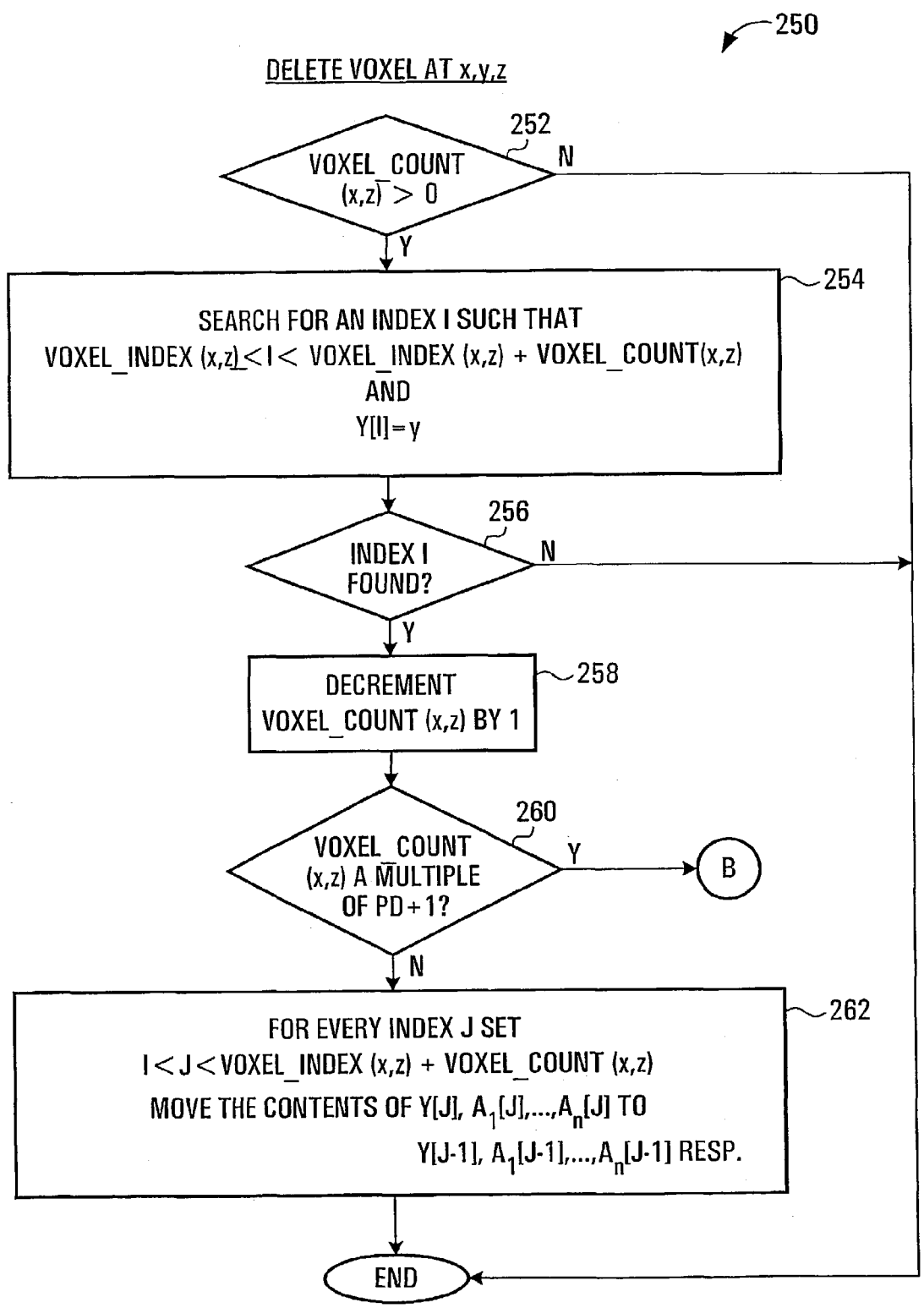
FIGS. 6A–6C depict a flowchart of a delete routine responsive to a delete command received or produced at the computer system of FIG. 1, for deleting voxel information from the data structure shown in FIG. 4.

Referring to FIGS. 3 and 6A, a flowchart of a delete algorithm is shown generally at 250. This algorithm begins with the first block 252 which directs the processor circuit 12 to determine whether or not the contents of the count field 158 specified by the x-z coordinates of the current voxel record are greater than zero. If not, there is no voxel stored at the indicated location and the algorithm is ended. Otherwise, the processor circuit 12 is directed to block 254 which causes it to search for an index I within the range of indices associated with the column specified by the x-z coordinates of the current voxel record and such that the contents of the Y-array at the found index value are equal to the y coordinate of the current voxel record. If an index satisfying the conditions specified in block 254 is not found, block 256 directs the processor circuit 12 to end the algorithm. Otherwise, if such an index is found, block 258 directs the processor circuit 12 to decrement by one, the contents of the count field 158 specified by the x-z coordinates of the current voxel record. Block 260 then directs the processor circuit 12 to determine whether or not the count specified by the x-z coordinates of the current voxel record are a multiple of PD+1. If not, the processor is directed to the segment of the algorithm shown in FIG. 6B and, if so, the processor circuit 12 is directed to block 262 which directs the processor circuit 12 to move the contents of memory locations specified by index numbers greater than the index number associated with x-z coordinates of the current record, to one position lower. This has the effect of removing voxel record information associated with the current record and shifting all the information associated with all subsequent indices of the group down by one. The delete algorithm is then ended.

Figure 6B:
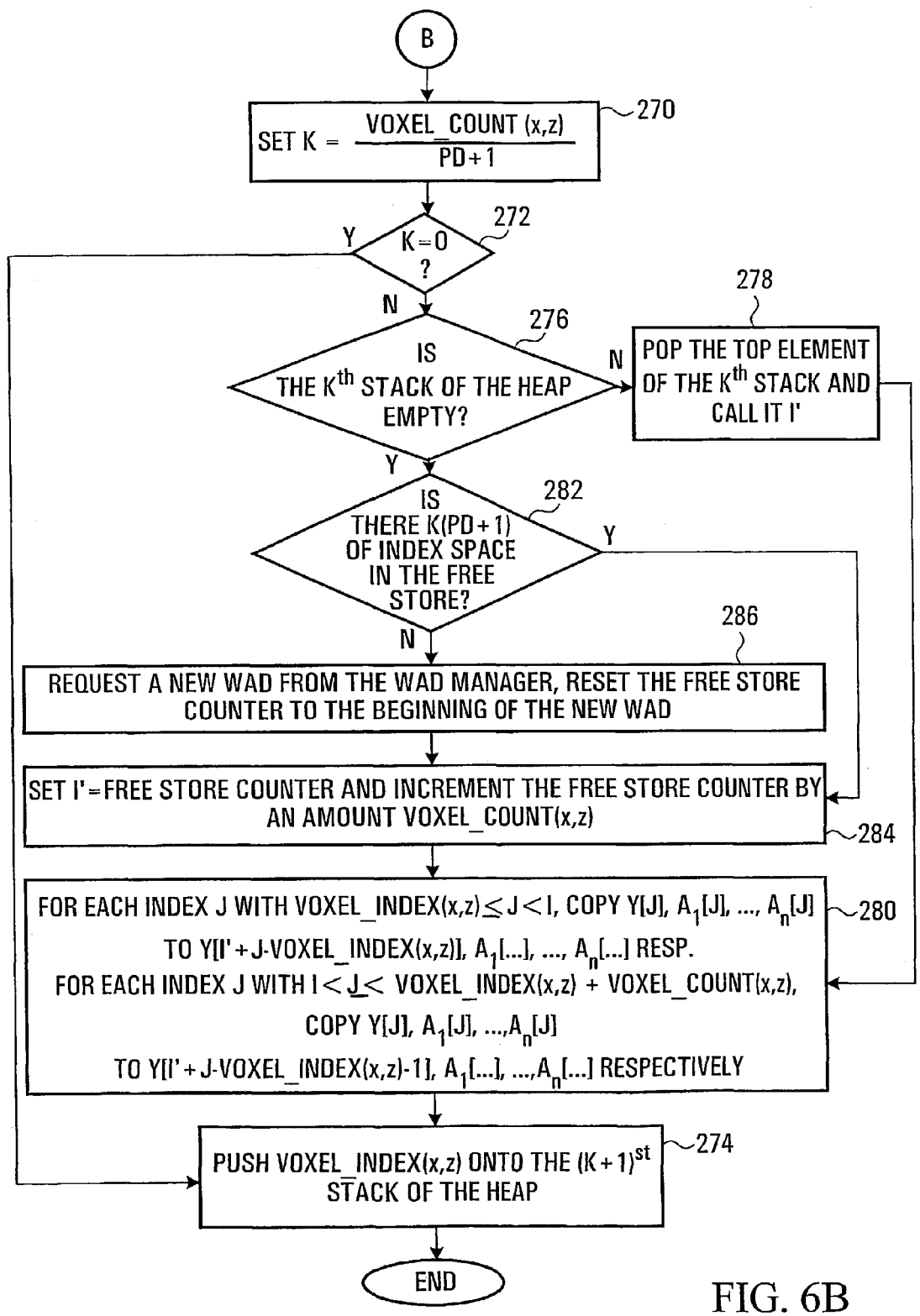

If at block 260 of FIG. 6A, the voxel number specified by the x-z coordinates of the current voxel position are a multiple of PD+1, the processor circuit 12 is directed to the segment of the algorithm shown in FIG. 6B, which begins with a first block 270 which directs the processor circuit 12 to set a variable K equal to the voxel count specified by the x-z coordinates of the current voxel record, divided by PD+1. Block 272 then directs the processor circuit 12 to determine whether or not K is equal to zero and, if so, block 274 directs the processor circuit 12 to push the current voxel index onto the $(K+1)^{st}$ stack and the algorithm is ended. If at block 272 K is not equal to zero, then block 276 directs the processor circuit 12 to determine whether the $K^{th}$ stack of the heap is empty. If not, then block 278 directs the processor circuit 12 to pop the top element of the $K^{th}$ stack and to assign it to the variable Iprime (I'). Then, block 280 directs the processor circuit 12 to copy voxel information from the group of memory locations associated with index numbers beginning at the voxel index number specified by the x-z coordinates of the current voxel record, to a new group of memory locations beginning at the index specified by the contents of the Iprime variable. Voxel information stored in memory locations associated with index numbers greater than the index number associated with the current voxel record is stored in memory locations of the new group in association with the remainder of the index numbers associated with the new group, until all voxel record information has been copied. Then, the processor circuit is directed back to block 274 to push the voxel index specified by the x-z coordinates of the current voxel record onto the $(k+1)^{st}$ stack of the heap 152 and the delete algorithm is ended.

If at block 276, the $K^{th}$ stack of the heap 152 is empty, then block 282 directs the processor circuit 12 to determine whether or not there is K(PD+1) of index space available in the free space 136. If so, then the processor circuit 12 is directed to block 284 which causes it to assign to the Iprime variable, the contents of the free space id field 154 and to increment the contents of the free space id field 154 by an amount equal to the voxel count specified by the x-z coordinates of the current record. The processor circuit is then directed to perform the functions indicated above in connection with blocks 280 and 274 and the delete algorithm is then ended.

If at block 282 there is not enough space in the free space 136, block 286 directs the processor circuit 12 to request a new wad of memory locations from the wad manager 31 and to reset the free space id field contents to hold an index representing the beginning of the new wad. The processor is then directed to carry out the functions of blocks 284, 280 and 274 and the delete algorithm is then ended.

Figure 6C:
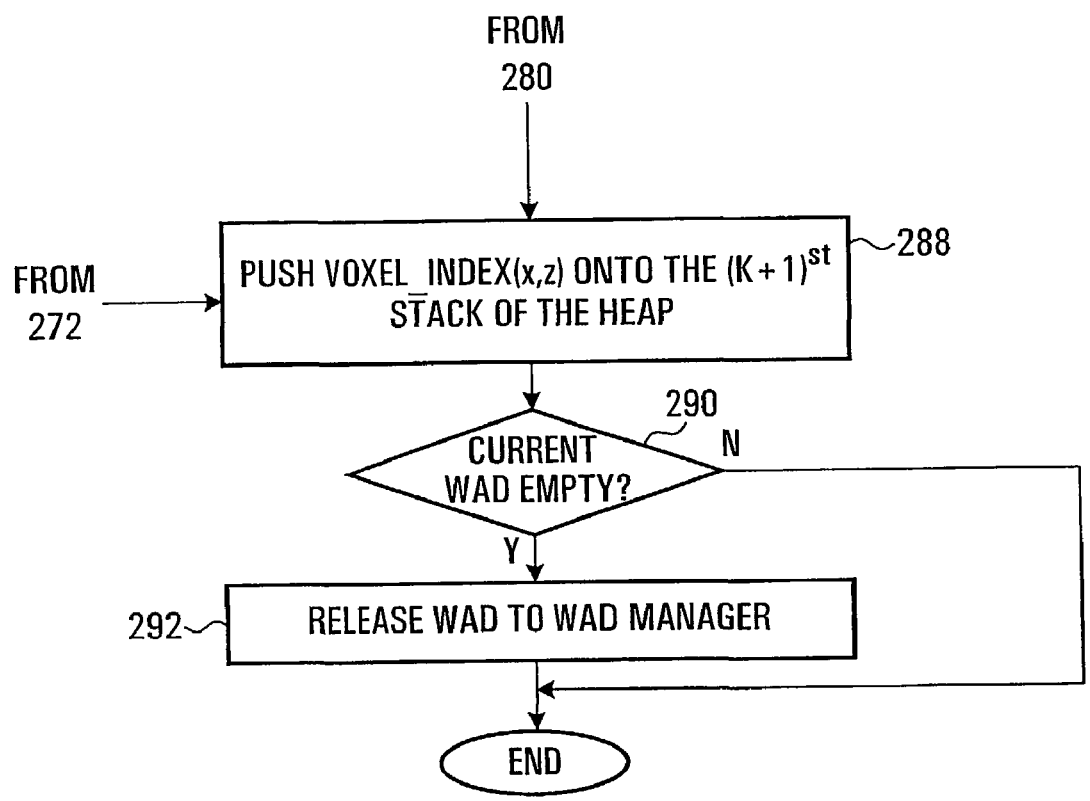

Referring to FIG. 6C, if during the deletion of a voxel record, a wad is rendered empty, then the additional segment of the delete algorithm shown in FIG. 6C may be executed by the processor circuit 12. This segment begins with a first block 288 which directs the processor circuit to push the voxel index specified by the x-z coordinates of the current voxel onto the $(k+1)^{st}$ stack of the heap 152. Then, block 290 directs the processor circuit 12 to determine whether or not the current wad is empty and, if not, to end the delete algorithm. If, however, the current wad is empty at block 290, then block 292 directs the processor to release the wad to the wad manager 31 before ending the delete algorithm.

Read Command

To read voxel information from the data structure, a read command is passed from an application program running on the processor circuit 12, to the processor circuit, to invoke a read algorithm.

Figure 7:
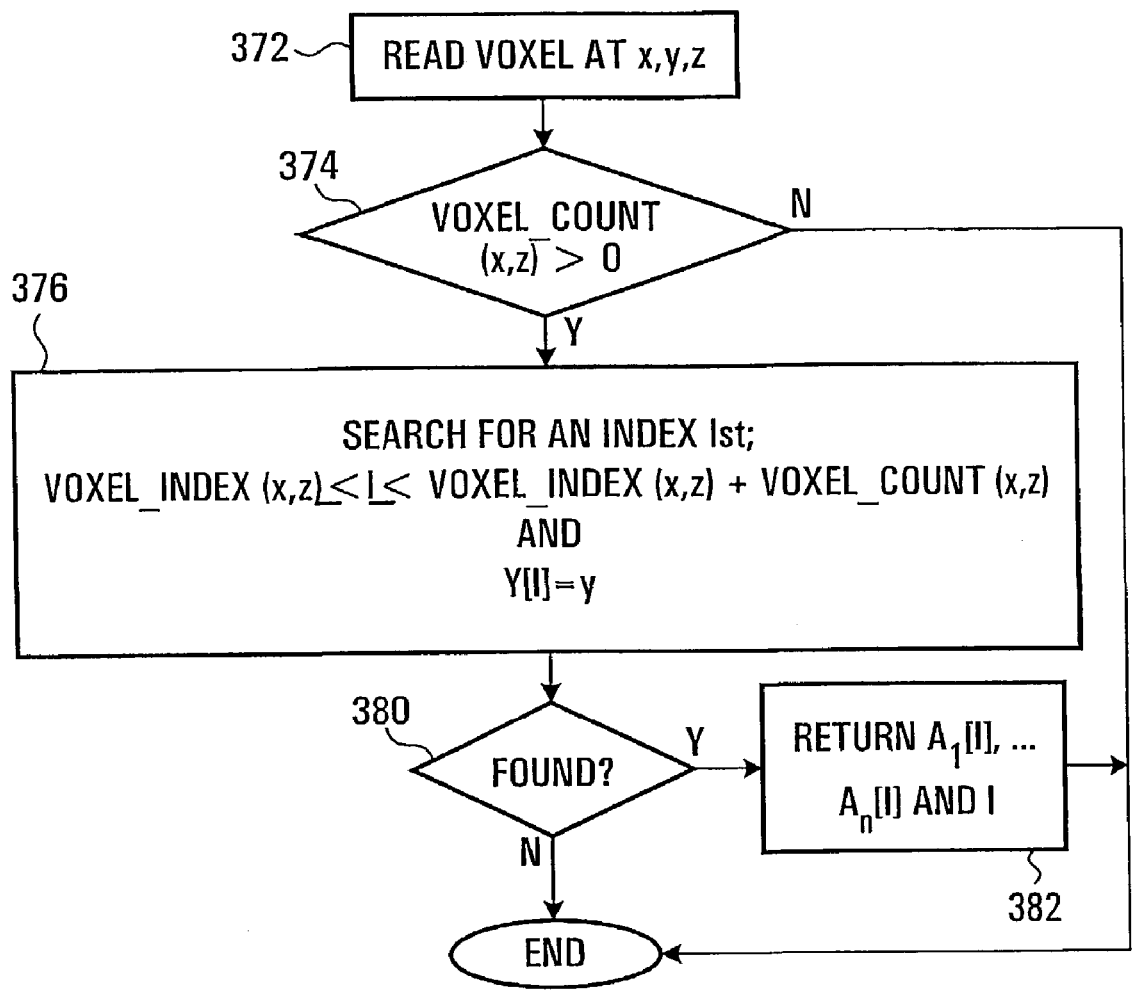
FIG. 7 is a flowchart of a read algorithm for reading active voxel information in the data structures shown in FIG. 4.

Referring to FIG. 7, a flowchart depicting a read algorithm is shown generally at 370. This algorithm begins with a first block 372 which directs the processor circuit 12 to read the voxel number at the current x-z position in the base array 150 defined by the three-tuple identifying the geometric coordinates of the voxel record to be deleted. Next, block 374 directs the processor circuit 12 to determine whether or not the voxel count associated with the current x-z position is greater than zero. If not, the read algorithm is ended.

If at block 374, the voxel count is greater zero, then block 376 directs the processor circuit 12 to search the Y-array 124 for the index corresponding to the y coordinate of the record to be deleted. This index may be referred to as the current index.

Then, block 380 directs the processor circuit 12 to determine whether or not an index corresponding to the y coordinate of the record to be read has been found. If not, then the read algorithm is ended. Otherwise, if a index corresponding to the current y coordinate is located, block 382 directs the processor circuit 12 to pass to the application program, the contents of the memory locations specified by the current index. Thus the geometric coordinates and the attributes of the currently identified voxel are passed to the requesting application program.

From the foregoing it will be appreciated that effectively, voxel data for a given active voxel column is treated as a unit and such data is stored contiguously in memory. Thus fragmentation of voxel data in memory is avoided.

A unit of information about a given column is identified by the starting index and voxel count specified by the contents of a position in the base array, the position being specified by the position of the column in the voxel block. The starting index identifies groups of memory locations within a plurality of arrays, which hold information about the active voxels in the column. The specific memory locations are obtained by combining base addresses of each array with the index. In the embodiment described, five arrays were shown, however, it will be appreciated that any number of arrays may be employed and new arrays may be added at any time, by a user, without disrupting any data that has already been stored in the data structure.

By treating active voxel column data as units in the manner provided herein, each unit may be accessed randomly and once a unit has been specified, data relating to a specific voxel can be accessed quickly, since such voxel data is stored contiguously. Thus, when rendering, a column may be addressed and the data relating to active voxels in the column may be virtually instantly accessed by reading data relating to voxel positions along the column. Thus voxel data is effectively randomly accessible, providing rapid data access. This is particularly valuable for rendering, where a column can be specified and then active voxel information for active voxels within the column can be accessed by sequentially stepping through the indices within the set of indices associated with the column.

In addition, since the voxel data for voxels in a given column of active voxels is treated as a unit, data representing active voxels in a given column may be compressed and stored in a compressed format. Each attribute may be assigned a different compression algorithm, for example, thus providing for selection of the most optimal compression algorithms for use with different types of data in corresponding arrays. In other words, each array may be associated with a different compression algorithm which is best suited to compress the type of data stored in that array.

It will be appreciated from the foregoing that storage requirements for voxel information are kept to a minimum by storing information associated with only the active voxels in the voxel block. This represents a compaction of the original data representing the object model. Data storage requirements may be further reduced by compacting the data in the data structure to effectively remove the unused groups of memory locations. In effect a form of data compaction is achieved as the data structure is used, because as groups of memory locations are associated with columns of active voxels, groups of fixed size are defined (i.e., n(PD+1)). If a new voxel is added to the column, information relating to that voxel is stored in the group already assigned to that column, if possible.

If a new voxel is added to the column and new information relating to that voxel causes a new group of a larger size to be required, the previous groups is not abolished, but rather is identified as being available, through the functions of the stack and heap. Thus when a group of a particular size is needed, a group identified in the heap is selected first, to avoid consuming additional memory and leaving a "hole" in the memory. Thus, "holes" in the page currently in use by the processor are filled first wherever possible. This ensures data is stored in a compact format.

While specific embodiments of the invention have been described and illustrated, such embodiments should be considered illustrative of the invention only and not as limiting the invention as construed in accordance with the accompanying claims.

What is claimed is:

1. A volumetric data organization method for organizing data associated with active voxels in a voxel block, the voxel block comprising active voxels and non-active voxels where active voxels are those occupied voxels for which information has been obtained or provided and non-active voxels are unoccupied voxels, the method comprising:
    causing each active voxel in a column of voxels in the voxel block to be associated with a respective contiguous memory location in a first group of memory locations associated with said column while not causing any of the non-active voxels to be associated with said contiguous memory locations; and
    causing position information indicating positions of the active voxels in said column to be stored in respective said contiguous memory locations of said first group,
    wherein causing each active voxel to be associated with a respective contiguous memory location comprises determining the number of active voxels in said column.

2. The method of claim 1 wherein causing position information to be stored comprises causing said position information of contiguous active voxels in said column to be stored in respective said contiguous memory locations in order of increasing distance of said contiguous active voxels from a base of the voxel block.

3. The method of claim 1 wherein causing each active voxel to be associated with a respective contiguous memory location comprises locating a group of said contiguous memory locations having at least the same number of memory locations as the number of active voxels in said column, for use as said first group.

4. The method of claim 3 further comprising associating said column with an element in a base array.

5. The method of claim 4 wherein each of said contiguous memory locations is associated with a respective index and wherein associating said column with said element in a base array comprises associating said element with a representation of a starting index associated with a first memory location associated with a first active voxel in said column and associating said element with a representation of a number of active voxels in said column.

6. The method of claim 5 further comprising changing said representation of said starting index when volumetric data representing a voxel in a position nearer to a reference position is received.

7. The method of claim 5 further comprising changing said representation of said number of active voxels in said column when said number of active voxels in said column changes.

8. The method of claim 3 wherein locating said group of contiguous memory locations comprises associating with said column a starting index of a group of contiguous memory locations previously used.

9. The method of claim 8 wherein associating comprises storing said starting index in a base array.

10. The method of claim 3 wherein locating a group of contiguous memory locations comprises associating with said column a starting index of a free space.

11. The method of claim 10 further comprising producing said new free space starting index.

12. The method of claim 1 further comprising:
    causing each active voxel in said column of voxels in the voxel block to be associated with a respective contiguous memory location in a second group of memory locations associated with said column; and
    causing attribute information relating to the active voxels in said column to be stored in respective said contiguous memory locations of said second group of memory locations associated with said column.

13. The method of claim 12 further comprising maintaining a plurality of stacks associated with different sized groups of memory locations, each stack being operable to hold at least one identifier identifying a group of corresponding size.

14. The method of claim 13 further comprising configuring said each stack to hold at least one index identifying the start of said group of corresponding size.

15. The method of claim 13 wherein configuring said each stack comprises causing said different sized groups of memory locations to have sizes defined as a function of packing density.

16. The method of claim 13 wherein configuring said each stack comprises configuring said different sized groups of memory locations to have sizes n(PD+1) where n is an integer multiplier and PD is a packing density value.

17. The method of claim 12 further comprising defining voxel element arrays for storing said position information or said attribute information within a wad of memory.

18. The method of claim 17 wherein defining comprises defining said voxel element arrays within a wad of memory located within a page of memory.

19. The method of claim 17 wherein defining comprises defining said voxel element arrays to have a management area and a free space area.

20. The method of claim 19 wherein defining comprises defining a base array in said management area of at least one of said voxel element arrays.

21. A data structure embodied in a computer readable medium, the data structure comprising:
    a plurality of voxel element arrays comprised of contiguous memory locations, said arrays being arranged and associated with a set of indices whereby indices of said set identify corresponding contiguous memory locations in each array of said voxel element arrays; and
    a base array for storing an identification of a group of said contiguous memory locations in said each array in which voxel elements of a corresponding group of active voxels in the same column of a voxel block may be stored,
    wherein said base array is configured to store an index and a count of voxel indices associated with said group of said contiguous memory locations.

22. A volumetric data storage method for storing information associated with a new active voxel, in the data structure according to claim 21, the method comprising:
    determining whether a group of said contiguous memory locations, of appropriate size, is available to store the information of all active voxels in the column associated with the new active voxel and the information associated with the new active voxel;
    storing said information associated with the new active voxel in said group of memory locations of appropriate size, if one is available; and
    causing a group memory locations, of appropriate size, to be made available when no group of memory locations of appropriate size is available.

23. The method of claim 22 wherein storing comprises assigning a new index to the new active voxel, said new index identifying at least one location in said group of contiguous memory locations, at which at least some of said information may be stored.

24. The method of claim 23 further comprising shifting information associated with voxels in positions, in said group of contiguous memory locations, having indices greater than or equal to the new index, to greater indices of said group of contiguous memory locations.

25. The method of claim 22 wherein storing comprises reassigning information associated with voxels associated with indices equal to or greater than said new index to new indices in a different group of contiguous memory locations.

26. The method of claim 25 further comprising retrieving a starting index of a previously used group of memory locations of appropriate size.

27. The method of claim 22 wherein causing a group of contiguous memory locations, of appropriate size, to be made available comprises defining said group, of contiguous memory locations, of appropriate size, in a free space area of memory.

28. The method of claim 27 wherein causing a group of contiguous memory locations, of appropriate size, to be created further comprises allocating a wad of memory to extend said free space area.

29. A deletion method for deleting voxel elements associated with a designated active voxel, from the data structure according to claim 21, the method comprising:
locating in the data structure an index associated with voxel elements associated with the designated active voxel; and
deleting the voxel elements associated with the designated active voxel, from memory locations in said arrays, defined by said index.

30. The method of claim 29 further comprising determining whether voxel elements associated with remaining voxels in the same column in which said designated active voxel is located can be stored in a next smaller sized group of contiguous memory locations and storing said voxel elements associated with said remaining voxels in said same column in said next smaller sized group.

31. The method of claim 30 wherein determining comprises determining whether said next smaller sized group of contiguous memory locations is available and storing said voxel elements associated with said remaining voxels in said same column in said next smaller sized group of contiguous memory locations, if one is available.

32. The method of claim 31 wherein storing comprises shifting voxel elements associated with voxels in positions associated with indices greater than or equal to an index associated with a position of said designated active voxel in said same column, to lesser indices of the same group of contiguous memory locations.

33. The method of claim 31 further comprising causing a group of contiguous memory locations, of said next smaller size to be made available when no group of contiguous memory locations, of said next smaller size is available.

34. The method of claim 33 further comprising retrieving a starting index of a previously used group of contiguous memory locations, of said next smaller size.

35. The method of claim 34 wherein causing a group of contiguous memory locations, of said next smaller size to be made available comprises defining said group of contiguous memory locations, of said next smaller size in a free space area of memory.

36. The method of claim 35 wherein causing a group of contiguous memory locations, of said next smaller size to be made available further comprises allocating a wad of memory to extend said free space area.

37. A method of accessing a voxel element associated with a designated voxel where said voxel elements are stored in the data structure of claim 21, the method comprising:
locating in the data structure an index associated with said designated active voxel;
outputting said voxel element from memory locations identified by said index.

38. A data structure embodied in a computer readable medium, the data structure comprising:
a plurality of voxel element arrays comprised of contiguous memory locations, said arrays being arranged and associated with a set of indices whereby indices of said set identify corresponding contiguous memory locations in each array of said voxel element arrays;
a base array for storing an identification of a group of said contiguous memory locations in said each array in which voxel elements of a corresponding group of active voxels in the same column of a voxel block may be stored; and
a plurality of stacks associated with different sized groups of said memory locations, each stack being operable to hold at least one identifier identifying a group of corresponding size.

39. The data structure of claim 38 wherein said each stack is configured to hold at least one index identifying the start of a group of corresponding size.

40. The data structure of claim 38 wherein said different sized groups of said memory locations have sizes defined as a function of packing density.

41. The data structure of claim 38 wherein said different sized groups of memory locations have sizes n(PD+1) where n is an integer multiplier and PD is a packing density value.

42. A data structure embodied in a computer readable medium, the data structure comprising:
a plurality of voxel element arrays comprised of contiguous memory locations, said arrays being arranged and associated with a set of indices whereby indices of said set identify corresponding contiguous memory locations in each array of said voxel element arrays; and
a base array for storing an identification of a group of said contiguous memory locations in said each array in which voxel elements of a corresponding group of active voxels in the same column of a voxel block may be stored;
wherein each of said voxel element arrays includes a management area and a free space area.

43. The data structure of claim 42 wherein said base array is located in said management area of at least one of said voxel element arrays.

44. A method of facilitating storage of voxel information in a data structure, where the voxel information is associated with active voxels in a voxel block, the voxel block comprising active voxels and non-active voxels, the active voxels being those occupied voxels for which information has been obtained or provided and the non-active voxels being unoccupied voxels, the method comprising:
defining a plurality of voxel element arrays of memory locations for storing the voxel information;
associating said arrays with a set of indices whereby indices of said set identify corresponding memory locations in each array in said voxel element arrays; and defining a base array for storing an identification of a group of contiguous memory locations in said each array in which voxel information of a corresponding group of active voxels is stored while no information of non-active voxels is stored in any group of contiguous memory locations, wherein storing said identification comprises storing an index and a count of voxel indices associated with said group of contiguous memory locations.

45. The method of claim 44 further comprising defining a plurality of stacks and associating said stacks with different sized groups of contiguous memory locations, each stack being operable to hold at least one identification identifying a group of corresponding size.

46. The method of claim 45 further comprising defining said stacks such that said different sized groups of contiguous memory locations have sizes defined as a function of packing density.

47. The method of claim 45 further comprising defining said stacks such that said different sized groups of contiguous memory locations have sizes n(PD+1) where n is an integer multiplier and PD is a packing density value.

48. The method of claim 44 wherein defining comprises associating a wad of memory locations with said voxel element arrays.

49. The method of claim 44 wherein defining said voxel element arrays comprises defining within each of said voxel element arrays a management area and a free space area.

50. The method of claim 49 wherein defining said base array comprises defining said base array in said management area of at least one of said voxel element arrays.

51. The method of claim 44 further comprising invoking an insertion routine to store information about an active voxel in the data structure.

52. The method of claim 44 further comprising invoking a deletion routine to delete information about an active voxel in the data structure.

53. The method of claim 44 further comprising invoking a read routine to obtain information about an active voxel from the data structure.

54. A volumetric data organization method for organizing data associated with active voxels in a voxel block, the voxel block comprising active voxels and non-active voxels where active voxels are those occupied voxels for which information has been obtained or provided and non-active voxels are unoccupied voxels, the method comprising:

causing each active voxel in a column of voxels in the voxel block to be associated with a respective contiguous memory location in a first group of memory locations associated with said column while not causing any of the non-active voxels to be associated with said contiguous memory locations; and causing position information indicating positions of the active voxels in said column to be stored in respective said contiguous memory locations of said first group, wherein causing each active voxel to be associated with a respective contiguous memory location comprises locating a group of said contiguous memory locations having at least the same number of memory locations as the number of active voxels in said column, for use as said first group.

55. A volumetric data organization method for organizing data associated with active voxels in a voxel block, the voxel block comprising active voxels and non-active voxels where active voxels are those occupied voxels for which information has been obtained or provided and non-active voxels are unoccupied voxels, the method comprising:

causing each active voxel in a column of voxels in the voxel block to be associated with a respective contiguous memory location in a first group of memory locations associated with said column while not causing any of the non-active voxels to be associated with said contiguous memory locations;

causing position information indicating positions of the active voxels in said column to be stored in respective said contiguous memory locations of said first group;

causing each active voxel in said column of voxels in the voxel block to be associated with a respective contiguous memory location in a second group of memory locations associated with said column; and causing attribute information relating to the active voxels in said column to be stored in respective said contiguous memory locations of said second group of memory locations associated with said column.

56. A method of facilitating storage of voxel information in a data structure, where the voxel information is associated with active voxels in a voxel block, the voxel block comprising active voxels and non-active voxels, the active voxels being those occupied voxels for which information has been obtained or provided and the non-active voxels being unoccupied voxels, the method comprising:

defining a plurality of voxel element arrays of memory locations for storing the voxel information;

associating said arrays with a set of indices whereby indices of said set identify corresponding memory locations in each array in said voxel element arrays;

defining a base array for storing an identification of a group of contiguous memory locations in said each array in which voxel information of a corresponding group of active voxels is stored while no information of non-active voxels is stored in any group of contiguous memory locations; and defining a plurality of stacks and associating said stacks with different sized groups of contiguous memory locations, each stack being operable to hold at least one identification identifying a group of corresponding size.

57. A method of facilitating storage of voxel information in a data structure, where the voxel information is associated with active voxels in a voxel block, the voxel block comprising active voxels and non-active voxels, the active voxels being those occupied voxels for which information has been obtained or provided and the non-active voxels being unoccupied voxels, the method comprising:

defining a plurality of voxel element arrays of memory locations for storing the voxel information;

associating said arrays with a set of indices whereby indices of said set identify corresponding memory locations in each array in said voxel element arrays; and defining a base array for storing an identification of a group of contiguous memory locations in said each array in which voxel information of a corresponding group of active voxels is stored while no information of non-active voxels is stored in any group of contiguous memory locations, wherein defining said voxel element arrays comprises defining within each of said voxel element arrays a management area and a free space area.

58. A method of facilitating storage of voxel information in a data structure, where the voxel information is associated with active voxels in a voxel block, the voxel block comprising active voxels and non-active voxels, the active voxels being those occupied voxels for which information has been obtained or provided and the non-active voxels being unoccupied voxels, the method comprising:
  defining a plurality of voxel element arrays of memory locations for storing the voxel information;
  associating said arrays with a set of indices whereby indices of said set identify corresponding memory locations in each array in said voxel element arrays;
  defining a base array for storing an identification of a group of contiguous memory locations in said each array in which voxel information of a corresponding group of active voxels is stored while no information of non-active voxels is stored in any group of contiguous memory locations; and
  invoking an insertion routine to store information about an active voxel in the data structure.

59. A method of facilitating storage of voxel information in a data structure,
  where the voxel information is associated with active voxels in a voxel block, the voxel block comprising active voxels and non-active voxels, the active voxels being those occupied voxels for which information has been obtained or provided and the non-active voxels being unoccupied voxels, the method comprising:
  defining a plurality of voxel element arrays of memory locations for storing the voxel information;
  associating said arrays with a set of indices whereby indices of said set identify corresponding memory locations in each array in said voxel element arrays;
  defining a base array for storing an identification of a group of contiguous memory locations in said each array in which voxel information of a corresponding group of active voxels is stored while no information of non-active voxels is stored in any group of contiguous memory locations; and
  invoking a deletion routine to delete information about an active voxel in the data structure.

60. A method of facilitating storage of voxel information in a data structure,
  where the voxel information is associated with active voxels in a voxel block, the voxel block comprising active voxels and non-active voxels, the active voxels being those occupied voxels for which information has been obtained or provided and the non-active voxels being unoccupied voxels, the method comprising:
  defining a plurality of voxel element arrays of memory locations for storing the voxel information;
  associating said arrays with a set of indices whereby indices of said set identify corresponding memory locations in each array in said voxel element arrays;
  defining a base array for storing an identification of a group of contiguous memory locations in said each array in which voxel information of a corresponding group of active voxels is stored while no information of non-active voxels is stored in any group of contiguous memory locations; and
  invoking a read routine to obtain information about an active voxel from the data structure.

* * * * *

UNITED STATES PATENT AND TRADEMARK OFFICE
CERTIFICATE OF CORRECTION

PATENT NO. : 7,050,054 B2
APPLICATION NO. : 10/333307
DATED : May 23, 2006
INVENTOR(S) : P.A. Halmshaw It is certified that error appears in the above-identified patent and that said Letters Patent is hereby corrected as shown below:

On Title Page

| COLUMN | LINE | ERROR |
|---|---|---|
| Item (56) Pg. 2, col. 2 | Refs. Cited (Other Publs., Item 12) | "Kaufamn," should read --Kaufman,-- |

Signed and Sealed this

Twenty-first Day of November, 2006

JON W. DUDAS
*Director of the United States Patent and Trademark Office*